US008744970B2

(12) United States Patent
Kurihara et al.

(10) Patent No.: US 8,744,970 B2
(45) Date of Patent: Jun. 3, 2014

(54) INFORMATION COMMUNICATION SYSTEM, USER MANAGEMENT APPARATUS THEREOF, INFORMATION PROVIDING APPARATUS THEREOF AND USER TERMINAL APPARATUS THEREOF

(75) Inventors: Shinichi Kurihara, Yokohama (JP); Asahiko Yamada, Tokorozawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 767 days.

(21) Appl. No.: 12/071,522

(22) Filed: Feb. 21, 2008

(65) Prior Publication Data

US 2008/0162363 A1 Jul. 3, 2008

Related U.S. Application Data

(62) Division of application No. 11/219,691, filed on Sep. 7, 2005.

(30) Foreign Application Priority Data

Nov. 26, 2004 (JP) .................................. 2004-342444

(51) Int. Cl.
*G06Q 99/00* (2006.01)
(52) U.S. Cl.
USPC ................................................. 705/51; 726/8
(58) Field of Classification Search
USPC .......................................... 705/64, 51; 726/8
See application file for complete search history.

(56) References Cited

U.S. PATENT DOCUMENTS

| | | | | |
|---|---|---|---|---|
| 5,706,349 A | * | 1/1998 | Aditham et al. | 713/159 |
| 5,963,915 A | * | 10/1999 | Kirsch | 705/26.8 |
| 6,339,423 B1 | * | 1/2002 | Sampson et al. | 715/854 |
| 6,584,505 B1 | * | 6/2003 | Howard et al. | 709/225 |
| 7,016,960 B2 | * | 3/2006 | Howard et al. | 709/225 |
| 7,191,467 B1 | | 3/2007 | Dujari et al. | |

(Continued)

FOREIGN PATENT DOCUMENTS

| | | |
|---|---|---|
| CN | 1477810 A | 2/2004 |
| JP | 10-269291 | 10/1998 |

(Continued)

OTHER PUBLICATIONS

Combined Search and Examination Report issued by the British Patent Office, dated Jan. 24, 2006, for British Application No. GB0518120.1.

(Continued)

*Primary Examiner* — James D Nigh
(74) *Attorney, Agent, or Firm* — Finnegan, Henderson, Farabow, Garrett & Dunner LLP

(57) ABSTRACT

In an information communication system, user personal information is batch-managed in a user management center apparatus. The center apparatus issues temporary information, which includes temporary user information and temporary authentication information, in response to a log-in request from a user terminal apparatus that designates a net-shop apparatus, and sends the information to the user terminal apparatus and the designated net-shop apparatus. Thereby, if the user terminal apparatus sends an authentication request to the net-shop apparatus on the basis of the information, the net-shop apparatus can authenticate the user terminal apparatus on the basis of the information from the user management center apparatus. At this time, the user personal information does not go to the net-shop apparatus, and there is no need for the net-shop apparatus to manage the user personal information.

7 Claims, 16 Drawing Sheets

(56) References Cited

U.S. PATENT DOCUMENTS

| | | | |
|---|---|---|---|
| 7,350,079 B2* | 3/2008 | Botz ............................ | 713/182 |
| 7,353,282 B2* | 4/2008 | Nichols et al. ................ | 709/229 |
| 7,530,099 B2 | 5/2009 | Flurry et al. | |
| 2001/0037312 A1* | 11/2001 | Gray et al. ...................... | 705/67 |
| 2002/0095578 A1 | 7/2002 | Yamada et al. | |
| 2003/0135458 A1* | 7/2003 | Tadano et al. .................. | 705/40 |
| 2003/0204610 A1* | 10/2003 | Howard et al. ............... | 709/229 |

FOREIGN PATENT DOCUMENTS

| | | |
|---|---|---|
| JP | 2002-169720 | 6/2002 |
| JP | 2002-342688 | 11/2002 |
| JP | 2003-058979 | 2/2003 |
| JP | 2004-078515 | 3/2004 |
| WO | WO 98/22915 | 5/1998 |
| WO | WO 01/27821 A2 | 4/2001 |
| WO | WO 01/73706 A1 | 10/2001 |
| WO | WO 03/081547 A1 | 10/2003 |

OTHER PUBLICATIONS

Notification of the Second Office Action mailed Feb. 5, 2010 in Chinese Patent Application No. 200510099473.2 (8 pages).
Notification of Reasons for Rejection mailed Sep. 21, 2010 in Japanese Patent Application No. 2004-342444 (5 pages).
Yuichi Sakaguchi, New Method by Card Payment of EC Site, major card company providing an authentication function to reinforce security, Nikkei Computer, No. 588, Japan, Nikkei BP, Dec. 1, 2003, No. 588, p. 16-17.
Notification of Reasons for Rejection mailed Oct. 6, 2009 in Japanese Patent Application No. 2004-342444 and English translation thereof.
Kenji Fujita, magazine article, Nikkei Internet Solutions, Aug. 23, 2003, pp. 64-67, vol. 74.

* cited by examiner

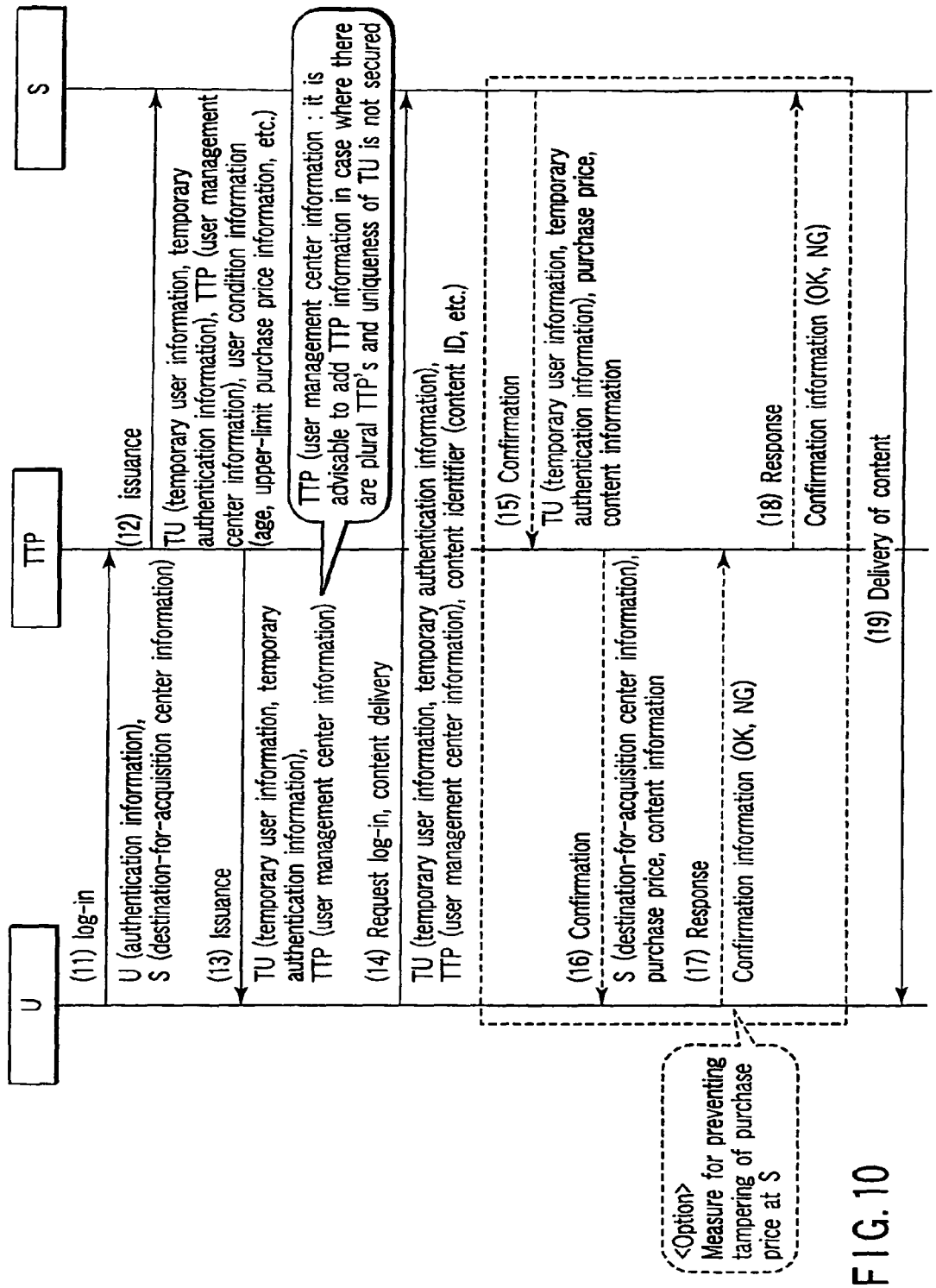
F I G. 10

INFORMATION COMMUNICATION SYSTEM, USER MANAGEMENT APPARATUS THEREOF, INFORMATION PROVIDING APPARATUS THEREOF AND USER TERMINAL APPARATUS THEREOF

CROSS-REFERENCE TO RELATED APPLICATIONS

This application is a divisional of application Ser. No. 11/219,691 filed Sep. 7, 2005 which claims the benefit of priority from the prior Japanese Patent Application No. 2004-342444, filed Nov. 26, 2004, all of which are incorporated herein by reference.

BACKGROUND OF THE INVENTION

1. Field of the Invention

The present invention relates generally to an information communication system for so-called online shopping, wherein a network user (hereinafter referred to as "user") executes a communication service for purchasing commodities (tangible/intangible) from a shop (hereinafter referred to as "net-shop") that is opened on a network, and more particularly to a technique that realizes a management system, which can securely and efficiently protect personal information of the user.

2. Description of the Related Art

In recent years, with developments of, e.g. communication technologies such as the Internet and data compression technologies using digital signal processing, online shopping using communication lines has been realized. Conventionally, most of commodities that are treated are tangible ones, and a procedure for delivering the commodities to the user is carried out after the contract of purchase is completed. Recently, however, with a remarkable increase in transmission data amount of communication lines, content such as songs, pictures and games with enormous data amounts has been treated as commodities that can be provided on line.

In general, in an information communication system for realizing the online shopping, for example, in a system that provides content as commodities, the user accesses an information providing apparatus of a content delivery center, which provides desired content, from a communication terminal (hereinafter referred to as "user terminal apparatus") such as a personal computer or a set-top box. The user sends a purchase request or a viewing/listening request according to a menu screen, thus enabling download or reproduction of the content.

Normally, in the system that provides content as commodities on line, content is encrypted and the encrypted content and a decryption key for the encrypted content are delivered to the user. In this case, the content delivery center receives a request from the user, and executes user authentication. If the user meets the condition for authentication, the encrypted content and content key are delivered to the user, and the user terminal apparatus is enabled to decrypt and reproduce the content.

As regards this kind of systems, there is a recent tendency that in an increasing number of cases the content delivery center, which delivers encrypted content, is separately provided from a key issuing center that delivers a content key. In addition, it is expected that in an increasing number of cases in the future, content delivery centers are separately provided for different genres and labels of content. On the other hand, a center that executes user management also serves as a center that executes accounting, etc. The problem encountered in this case is how to manage direct data transactions between the center that does not execute user management and the user terminal apparatus.

It may be thought that each of the respective centers individually executes user management. However, management of personal information requires high security, and a very expensive management system is needed. On the other hand, the user wishes to avoid, as much as possible, registration of personal information in fear of information leakage.

Jpn. Pat. Appln. KOKAI Publication No. 10-269291 discloses a scheme for a digital content delivery management system, wherein an accounting information management institution, a content displaying/delivering institution and a system management institution independently execute data communication with the user-side apparatus. The scheme disclosed in this document, however, aims at solving the problem that communication concentrates on the system side when the user acquires digital content from the system side or executes accounting for the use of the digital content, resulting in the difficulty in providing satisfactory responses to the user. This scheme does not aim at enhancing the security and efficiency of user management.

Jpn. Pat. Appln. KOKAI Publication No. 2002-169720 discloses a content delivery management scheme on the center side. In this scheme, as regards a delivery center and a viewing/listening apparatus, a center management area of a predetermined capacity is secured in a storage unit of the viewing/listening apparatus at a time of membership registration. Information indicative of the condition of use is stored in the center management area. The delivery management center manages the information stored in the center management area in each viewing/listening apparatus. In response to a content delivery request, the delivery management center refers to the stored information in the associated viewing/listening device, recognizes the condition of use of the viewing/listening apparatus, and provides a content storage instruction, etc. The scheme disclosed in this document, however, merely aims at enabling the center side to recognize the condition of use of each viewing/listening apparatus, and does not aim at enhancing the security and efficiency of user management.

The problems in the prior art have been described, referring, by way of example, to the information communication system that executes content delivery services. However, the problem of leakage of personal information and the inefficient user management have been pointed out, not only with respect to the content delivery services but also with respect to various online information communications.

As has been described above, in the conventional information communication system that realizes online shopping, information providing apparatuses that serve as a net-shop are disposed in a distributed fashion according to tasks and roles relating to the provision of services, and there arises a need to individually execute communication with each user terminal apparatus. However, many problems relating to security and cost have been pointed out with respect to the individual user management that is executed by the plural distributed information providing apparatuses.

BRIEF SUMMARY OF THE INVENTION

The object of the present invention is to provide an information communication system, a user management apparatus thereof, an information providing apparatus thereof and a user terminal apparatus thereof, which can securely and economically manage user personal information that is needed when communication is executed between an information providing apparatus and the user terminal apparatus.

According to the present invention, there is provided an information communication system in which a user terminal apparatus access an information providing apparatus over a network and execute user authentication, thereby executing a communication service for purchasing a commodity, the system comprising: a user management apparatus that is disposed on the network, manages personal information of the user terminal apparatus, and issues temporary information, which includes temporary user information and temporary authentication information, in accordance with a request from the user terminal apparatus, wherein the user authentication between the user terminal apparatus and the information providing apparatus is executed by the temporary information that is issued by the user management apparatus.

In this case, the user terminal apparatus presents the temporary information to the information providing apparatus when the user terminal apparatus accesses the information providing apparatus from which the commodity is to be purchased, the information providing apparatus forwards the temporary information, which is presented by the user terminal apparatus at the time of access, to the user management apparatus, and requests user authentication, and the user management apparatus executes the user authentication with respect to the temporary information that is forwarded from the information providing apparatus, and informs the information providing apparatus of a result of the user authentication.

Alternatively, the user management apparatus sends the temporary information to the user terminal apparatus that is an origin of the request, and also sends the temporary information to the information providing apparatus that is designated by the user terminal apparatus, the user terminal apparatus presents the temporary information to the information providing apparatus when the user terminal apparatus accesses the information providing apparatus from which the commodity is to be purchased, and the information providing apparatus executes the user authentication with respect to the temporary information from the user terminal apparatus on the basis of the temporary information from the user management apparatus.

Additional advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 10 is a sequence chart that illustrates the flow of information between the respective apparatuses in the system shown in FIG. 8;

DETAILED DESCRIPTION OF THE INVENTION

Embodiments of the present invention will now be described in detail with reference to the accompanying drawings.

First Embodiment

Figure 1:
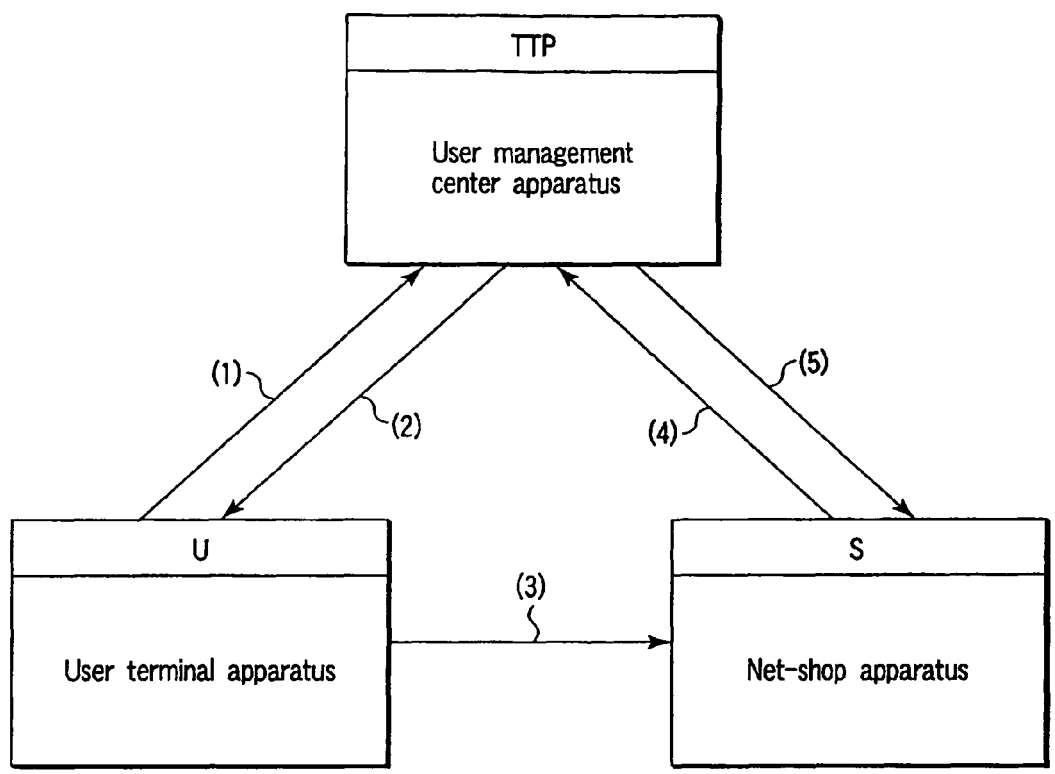
FIG. 1 is a conceptual view that illustrates the structure and the flow of information of a first embodiment of an information communication system according to the present invention.

FIG. 1 is a conceptual view that illustrates the schematic structure of an information communication system for online shopping according to a first embodiment of the present invention. This system is a system for a case in which a so-called net-shop is deployed. In this system for a net-shop, commodity information is provided to a user on the Internet, and the user designates a commodity to be purchased from among the commodities, the information on which has been provided. Then, the designated commodity is delivered to the user, and accounts are settled. In FIG. 1, TTP designates an apparatus ("user management center apparatus") that is disposed in a user management center and functions to manage user personal information that is necessary for the user to enjoy online shopping services on the network. Symbol S denotes an information providing apparatus ("net-shop apparatus") for operating the net-shop on the network, and U designates a user terminal apparatus that enables the user to communicate with the user management center apparatus TTP and net-shop apparatus S over the network.

Figure 2:
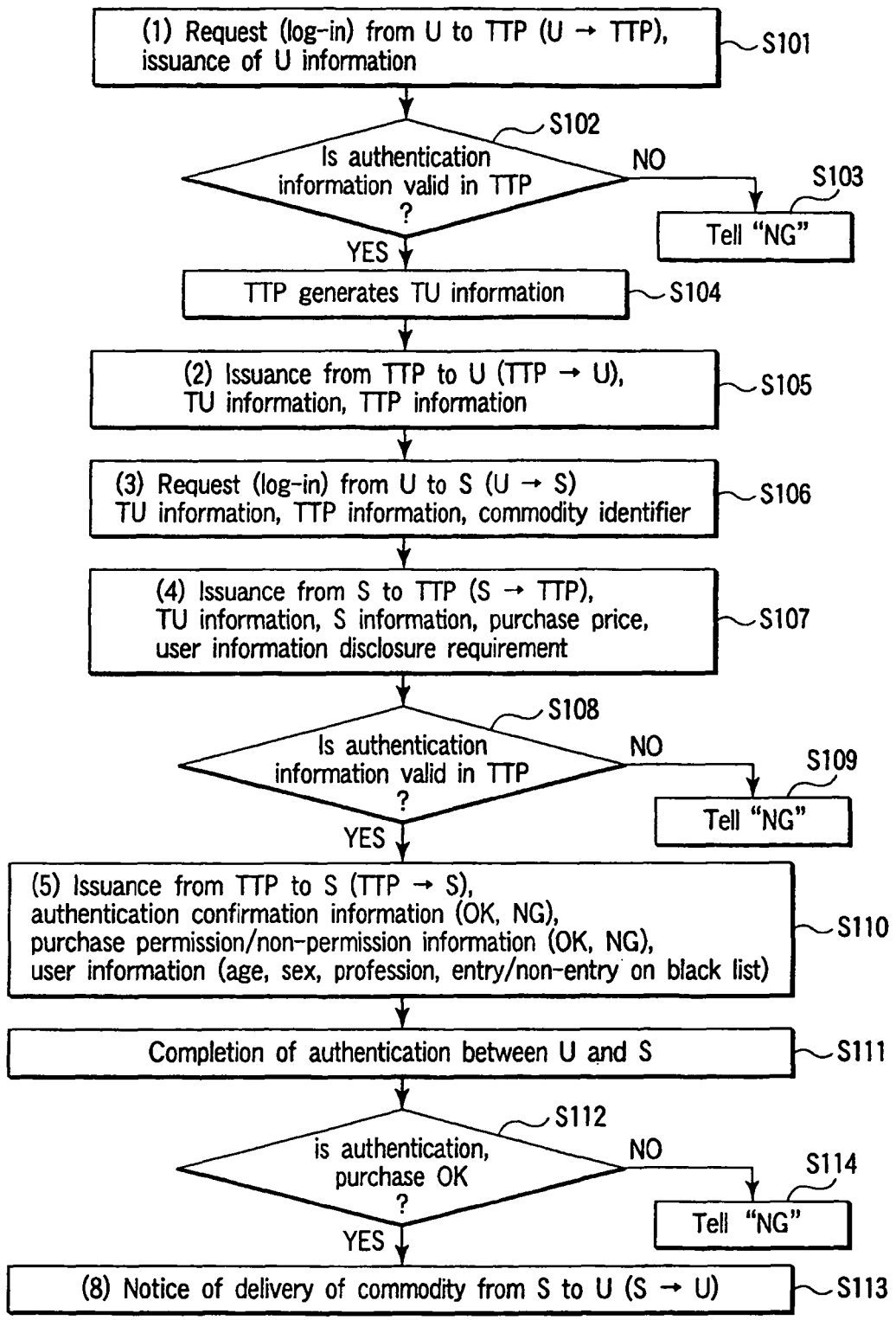
FIG. 2 is a flow chart that illustrates the flow of an overall process in the system shown in FIG. 1.
Figure 3:
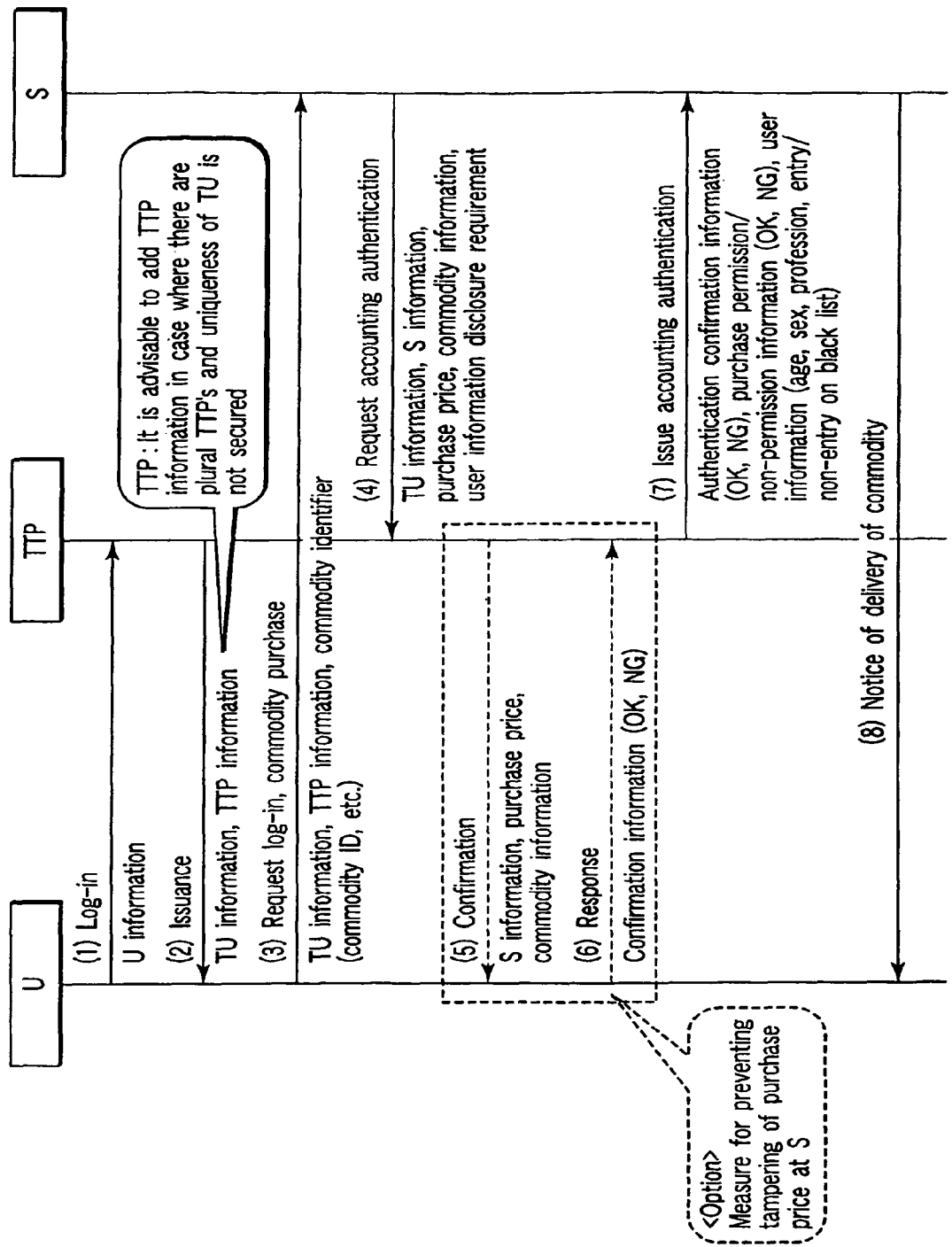
FIG. 3 is a sequence chart that illustrates the flow of information between the respective apparatuses in the system shown in FIG. 1.

Referring now to FIG. 2 and FIG. 3, the flow of the process of the system with the above-described structure is explained.

FIG. 2 illustrates the flow of the process in the whole system, and FIG. 3 illustrates a process sequence between the apparatuses in the system.

For the purpose of simple description, temporary information that comprises temporary user information and temporary authentication information is referred to as TU information; information that designates the user management center apparatus TTP is referred to as TTP information; information that designates the net-shop apparatus S is referred to as S information; and information that designates the user terminal apparatus U is referred to as U information.

The information (TTP information) that designates the user management center apparatus TTP may be included in the temporary information TU. The information that the user terminal apparatus U acquires from the user management center apparatus TTP may not necessarily include the net-shop information (S information) that is under the management of the user management center apparatus TTP. The user terminal apparatus U may store the S information in advance, and may specify the net-shop apparatus S on the basis of the S information and access the net-shop apparatus S to issue a purchase request. At this time, even in the case where the net-shop to be accessed has no transaction with the user management center apparatus TTP, user authentication based on the comparison with temporary information is disabled and access to the net-shop apparatus S by the user terminal apparatus U is rejected, and thus no practical problem will arise.

The general flow is described below.

(1) A user who desires a commodity net-sales service issues a log-in request to the user management center apparatus TTP via the user terminal apparatus U (FIG. 2: step S101). At this time, the user terminal apparatus U sends authentication information and net-shop designation information to the user management center apparatus TTP and undergoes authentication (FIG. 2: step S102). If the authentication fails, log-in is rejected as "NG" (FIG. 2: step S103).

(2) At the time of the log-in request by the user terminal in the process (1), the user management center apparatus TTP executes authentication on the basis of the authentication information and determines whether the user is a valid user (FIG. 2: step S102). If the user is a valid user, the user management center apparatus TTP generates temporary information TU comprising temporary user information and temporary authentication information that are used for temporary authentication (FIG. 2: step S104), and issues the temporary information TU to the user terminal apparatus (FIG. 2: step S105). In this case, where necessary, user management center information (e.g. in a case where there are a plurality of TTPs, or in a case where the uniqueness of temporary information TU is not secured) and a commodity identifier (commodity ID, etc.) are added (FIG. 2: step S105).

(3) Subsequently, the user terminal apparatus U sends, as a log-in/commodity purchase request, the temporary information TU, which is acquired from the user management center apparatus TTP, to the net-shop apparatus S from which the commodity is to be purchased, and issues the log-in request (FIG. 2: step S106). In this case, where necessary, user management center information TTP and commodity identifier (commodity ID, etc.) are added (FIG. 2: step S106).

(4) The net-shop apparatus S issues, as an accounting authentication request, the temporary information TU, which is received from the user terminal apparatus U, to the user management center apparatus TTP. Where necessary, the net-shop apparatus S additionally issues net-shop information S, a purchase price and a user information disclosure requirement (FIG. 2: step S107).

(5) Upon receiving the temporary information TU as the accounting authentication request from the net-shop apparatus S, the user management center apparatus TTP compares it with the temporary information TU that is issued to the user terminal apparatus U, thereby executing authentication based on the temporary information (FIG. 2: step S108). If the temporary information does not agree and is invalid, the user management center apparatus TTP tells "NG" to the net-shop apparatus S (FIG. 2: step S109). If the temporary information is successfully authenticated, the user management center apparatus TTP issues accounting authentication information including authentication confirmation information (OK, NG) and purchase permission/non-permission information (OK, NG) to the net-shop apparatus S. Where necessary, user information (age, sex, profession, entry/non-entry on black list) is added (FIG. 2: step S110).

(6) Upon receiving the issued information, the net-shop apparatus S completes the authentication process with the user terminal apparatus U (FIG. 2: step S111). If the authentication is successfully achieved and the purchase permission/non-permission information indicates "OK" (FIG. 2: step S112), the net-shop apparatus S notifies the user terminal apparatus U of delivery of the commodity (if the commodity is content, content information itself is delivered) (FIG. 2: step S113). If the authentication/purchase is "NG", the net-shop apparatus S notifies the user terminal apparatus U of "NG" (FIG. 2: step S114).

For example, in order to prevent tampering of a purchase price in the net-shop apparatus S, an optional process procedure, as indicated by a broken line in FIG. 3, is prepared in the process sequence. In this optional process procedure, when the accounting authentication request is issued from the net-shop apparatus S to the user management center apparatus TTP in the process (4), the user management center apparatus TTP sends a confirmation request, which includes net-shop information S, purchase price and commodity information, to the user terminal device (process (5)), receives a response (OK, NG) from the user terminal apparatus U (process (6)), and issues the aforementioned accounting authentication information to the net-shop apparatus S on the basis of the content of the response (process (7)).

After the information relating to the purchase price is confirmed by the user, the accounting process and commodity delivery process are executed. Therefore, the user can recognize the purchase price in advance, and it becomes possible to prevent tampering of the purchase price in the destination-for-acquisition center apparatus (net-shop apparatus) S.

Figure 4:
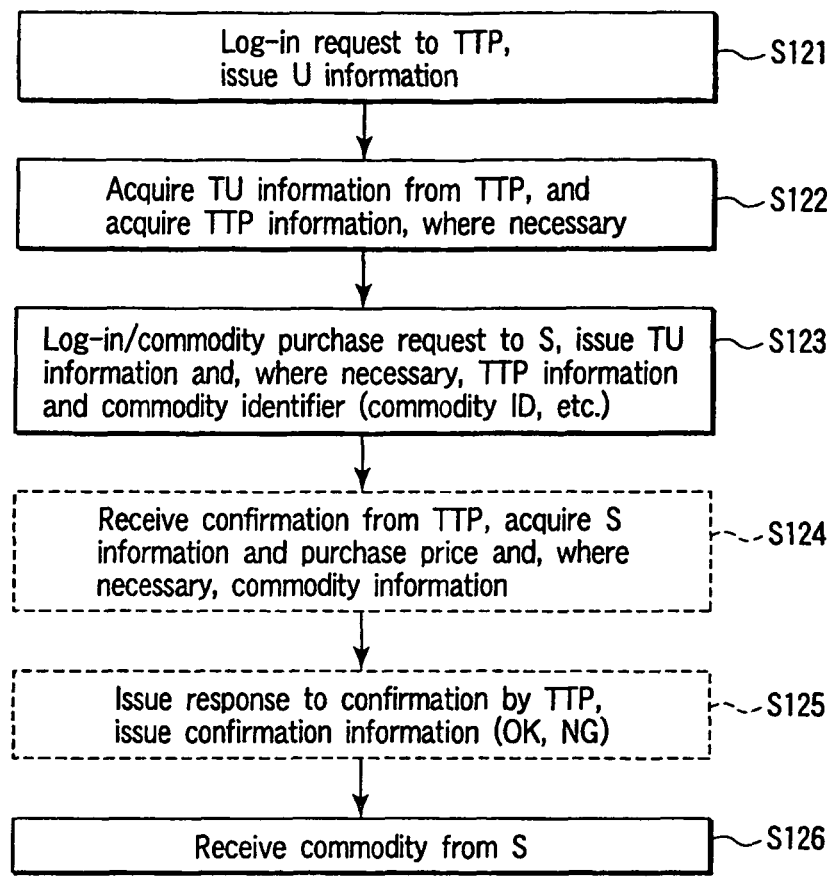
FIG. 4 is a flow chart that illustrates the flow of a process of a user terminal apparatus for realizing the first embodiment.
Figure 5:
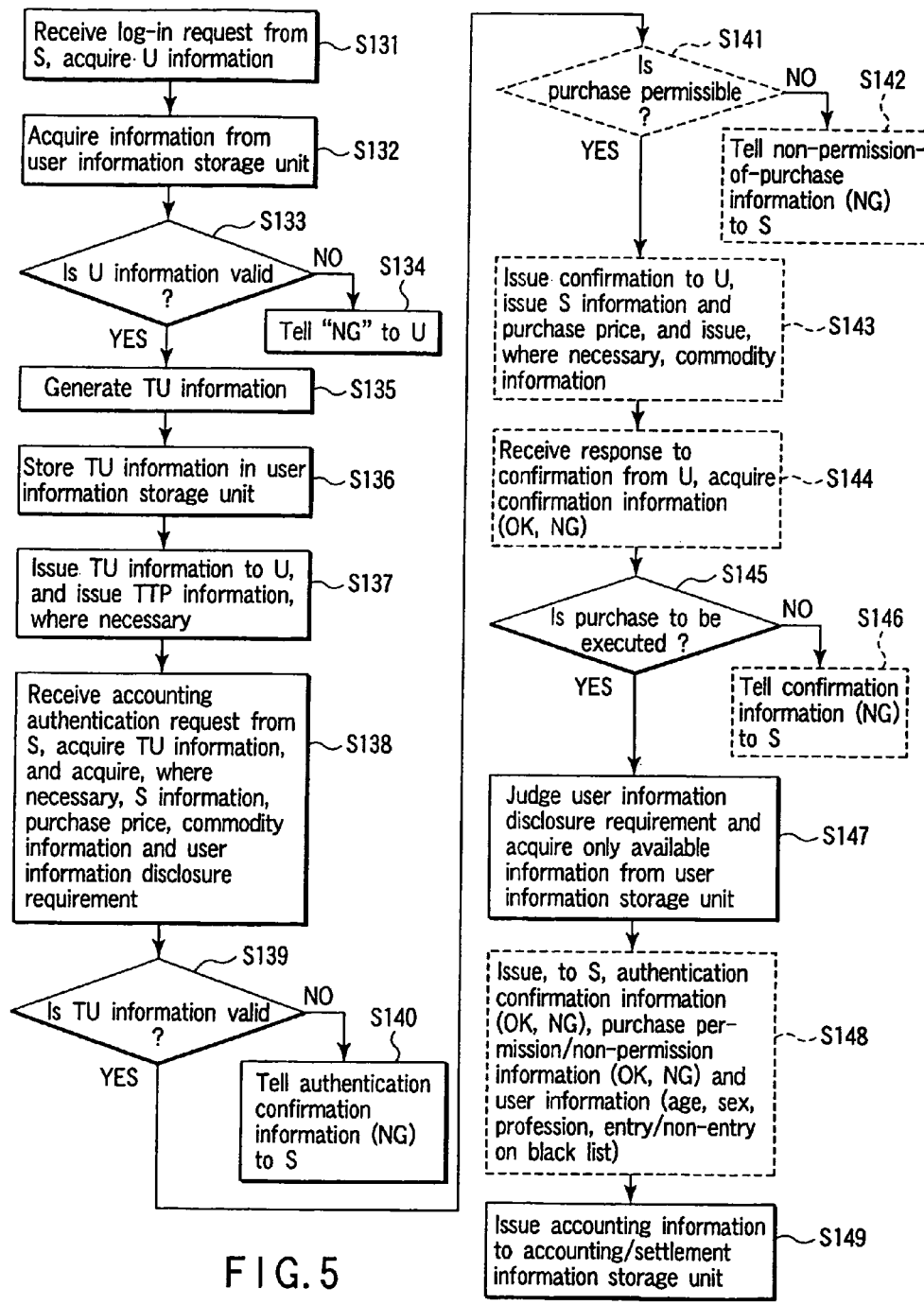
FIG. 5 is a flow chart that illustrates the flow of a process of a user management center apparatus for realizing the first embodiment.
Figure 6:
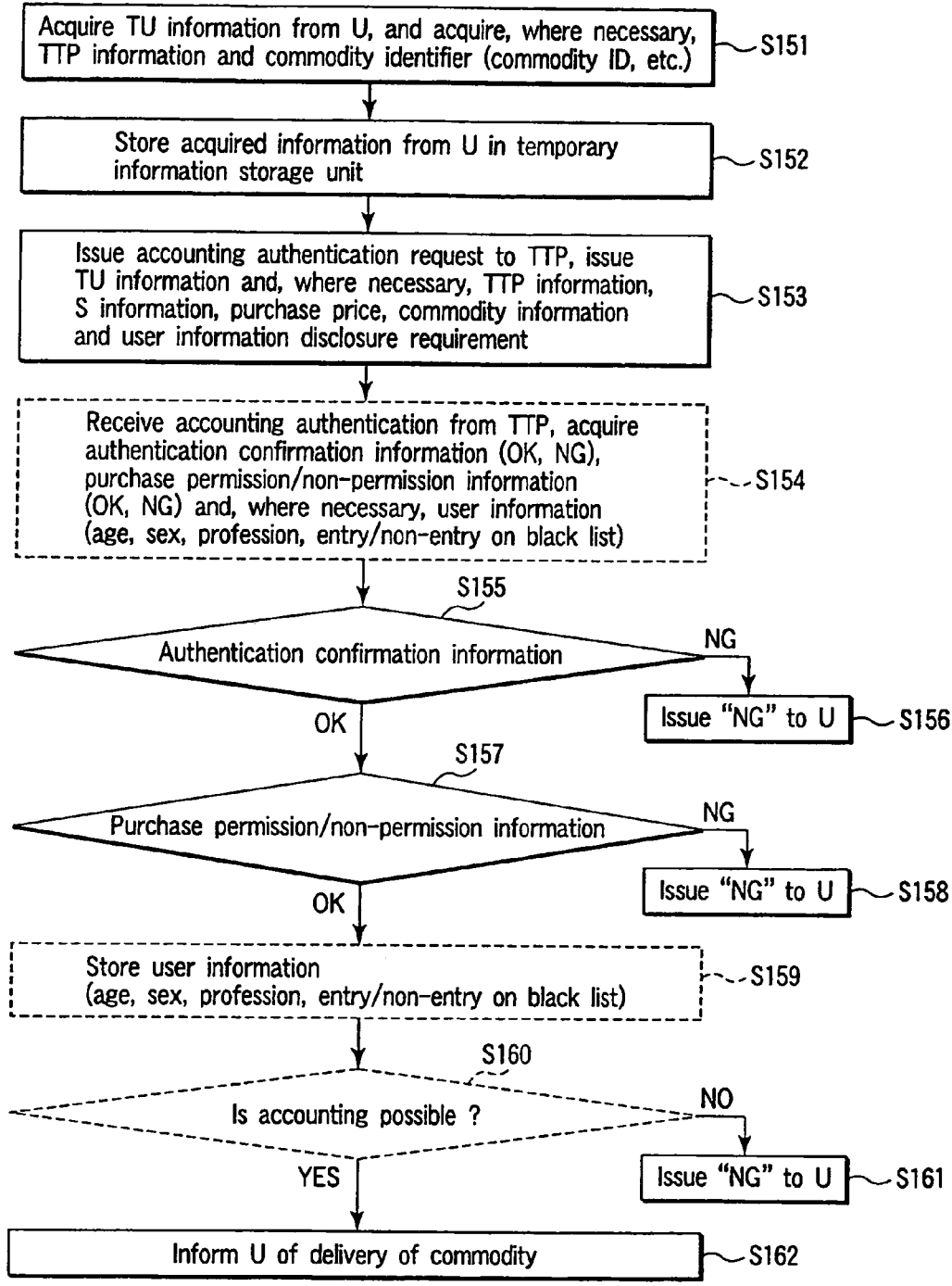
FIG. 6 is a flow chart that illustrates the flow of a process of a net-shop apparatus for realizing the first embodiment.

In order to realize the above process, the apparatuses U, TTP and S execute processes, as illustrated in flow charts of FIG. 4, FIG. 5 and FIG. 6. In FIGS. 4 to 6, process steps that are boxed in broken lines are optional ones, and may be omitted depending on cases.

As is shown in FIG. 4, the user terminal apparatus U sends a log-in request to the user management center apparatus TTP, and issues authentication information U for log-in (step S121). In connection with this, the user terminal apparatus U acquires temporary information (TU) that is issued from the user management center apparatus TTP, and also acquires, where necessary, user management center information (TTP) (step S122).

Subsequently, the user terminal apparatus U issues a log-in/commodity purchase request, along with the temporary information TU, to the net-shop apparatus S, and also issues, where necessary, user management center information TTP and a commodity identifier (commodity ID, etc.) (step S123).

In the case where the optional process for purchase price confirmation is set, the user terminal apparatus U receives a confirmation request from the user management center apparatus TTP, acquires net-shop information S and purchase price information, and acquires, where necessary, commodity information (step S124). Based on the received information, the user terminal apparatus U issues confirmation information (OK or NG) in response to the confirmation request from the TTP (step S125). After the process of step S123 or S125 is completed, the user can receive the commodity that is delivered from the net-shop apparatus S (step S126).

As is shown in FIG. 5, the user management center apparatus TTP receives the log-in request from the user terminal apparatus U and acquires the authentication information U (step S131). Then, the user management center apparatus TTP acquires personal information (authentication information) of the associated user from the user information storage unit (step S132) and determines whether the authentication information U is valid or not (step S133). If the authentication information U is not valid, the user management center apparatus TTP tells "NG" to the user terminal apparatus U and rejects the log-on (step S134).

If the authentication information U is valid, the user management center apparatus TTP generates temporary information TU (step S135), stores the temporary information TU in a user information storage unit (step S136), and issues the temporary information TU (along with user management center information TTP, where necessary) to the user terminal apparatus U (step S137).

Subsequently, if an accounting authentication request is issued from the net-shop apparatus S, the user management center apparatus TTP receives it, acquires temporary information TU that accompanies the accounting authentication request, and acquires, where necessary, the net-shop information S, purchase price, commodity information and user information disclosure requirement (step S138). At this time, the user management center apparatus TTP determines whether the acquired temporary information TU is valid or not (step S139). If the temporary information TU is not valid, the user management center apparatus TTP tells "NG", as confirmation information, to the net-shop apparatus S (step S140).

If the temporary information TU is valid and the optional process for purchase confirmation is set, the user management center apparatus TTP determines whether the user meets the condition for purchase of the commodity (step S141). If the user fails to meet the condition and the purchase is not permitted, the user management center apparatus TTP tells "NG", as confirmation information, to the net-shop apparatus S (step S142). If the purchase is permitted, the user management center apparatus TTP issues a confirmation request to the user terminal apparatus U, and issues the net-shop information S, purchase price information and, where necessary, commodity information to the user terminal apparatus U (step S143).

In the optional process for purchase confirmation, if the user management center apparatus TTP receives a response to the confirmation request from the user terminal apparatus U and receives confirmation information (OK, NG) (step S144), the user management center apparatus TTP determines, on the basis of the confirmation information, whether the purchase is to be executed or not (step S145). If the purchase is not to be executed ("NG"), the user management center apparatus TTP tells "NG", as confirmation information, to the net-shop apparatus S (step S146). If the purchase is to be executed ("OK"), the user management center apparatus TTP judges the user information disclosure requirement and acquires only available information from the user information storage unit (step S147). In this case, if the optional process for commodity purchase confirmation is set, the user management center apparatus TTP issues authentication confirmation information (OK, NG), purchase permission/non-permission information (OK, NG) and user information (age, sex, profession, entry/non-entry on black list) to the net-shop apparatus S (step S148).

After the process of step S147 or S148 is completed, the user management center apparatus TTP issues accounting information to an accounting/settlement information storage unit (step S149) and completes the series of process steps.

As is illustrated in FIG. 6, the net-shop apparatus S acquires temporary information TU from the user terminal apparatus U and acquires, where necessary, the user management center information TTP and commodity identifier (commodity ID, etc.) (step S151). The net-shop apparatus S stores the information, which is acquired from the user terminal apparatus U, in a temporary information storage unit (step S152). Then, the net-shop apparatus S issues an accounting authentication request to the user management center apparatus TTP, and issues, where necessary, the user management center information TTP, net-shop information S, purchase price, commodity information and user information disclosure requirement (step S153).

If the optional process for commodity purchase confirmation is set, the net-shop apparatus S accepts accounting authentication from the user management center apparatus TTP, and acquires authentication confirmation information (OK, NG), purchase permission/non-permission information (OK, NG) and, where necessary, user information (age, sex, profession, entry/non-entry on black list) (step S154).

After the process step S153 or S154 is completed, the net-shop apparatus S checks authentication confirmation information (step S155). If the authentication confirmation information is "NG", the net-shop apparatus S tells log-in rejection to the user terminal apparatus U (step S156). If the authentication confirmation information is "OK", the net-shop apparatus S checks purchase permission/non-permission information (step S157). If the purchase permission/non-permission information is "NG", the net-shop apparatus S tells rejection of purchase to the user terminal apparatus U (step S158). If the purchase permission/non-permission information is "OK" and the optional process is set, the net-shop apparatus S stores the user information (age, sex, profession, entry/non-entry on black list) (step S159), and determines whether accounting is possible (step S160). If accounting is not possible, the net-shop apparatus S issues purchase rejection (NG) to the user terminal apparatus U (step S161).

If the purchase permission/non-permission information is "OK" in step S157 or if the accounting is possible in step S160, the net-shop apparatus S informs the user terminal apparatus of delivery of the commodity (step S162).

According to the information communication system with the above-described structure, the user personal information is batch-managed in the user management center apparatus TTP, and the temporary information (temporary user information and temporary authentication information) TU is issued to the user terminal apparatus U and net-shop apparatus S. Thus, based on the temporary information, mutual authentication can be executed between the user terminal apparatus U and net-shop apparatus S, and it is possible to securely and economically execute batch-management of the user, which becomes necessary when communication is performed between a single or a plurality of net-shop apparatuses and the user terminal apparatus.

Example 1

Figure 7A:
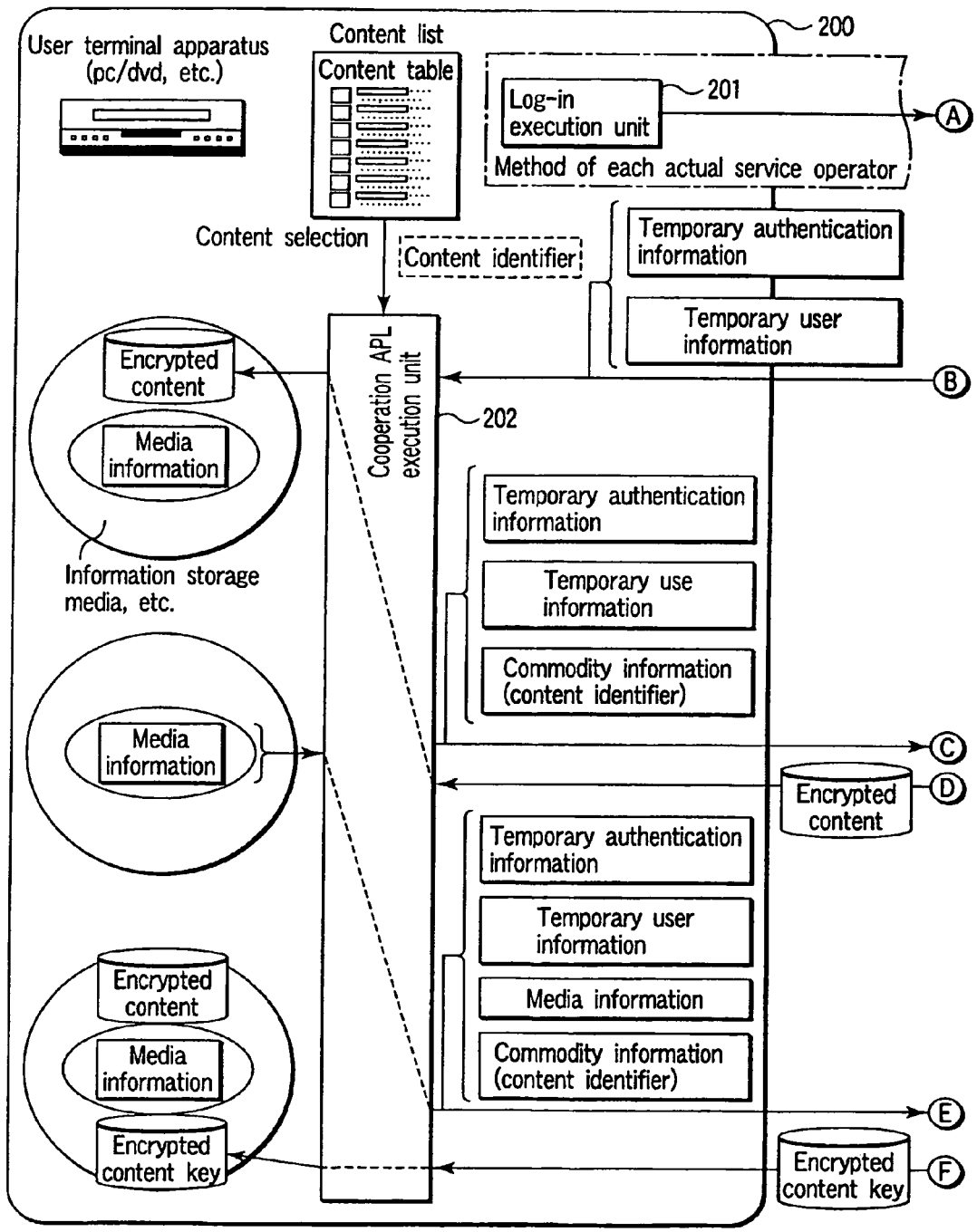
FIG. 7A and FIG. 7B are a conceptual view of Example 1, which schematically illustrates the structure and the flow of information in the case where the system configuration that is described in connection with the first embodiment is applied to a content delivery service providing system.
Figure 7B:
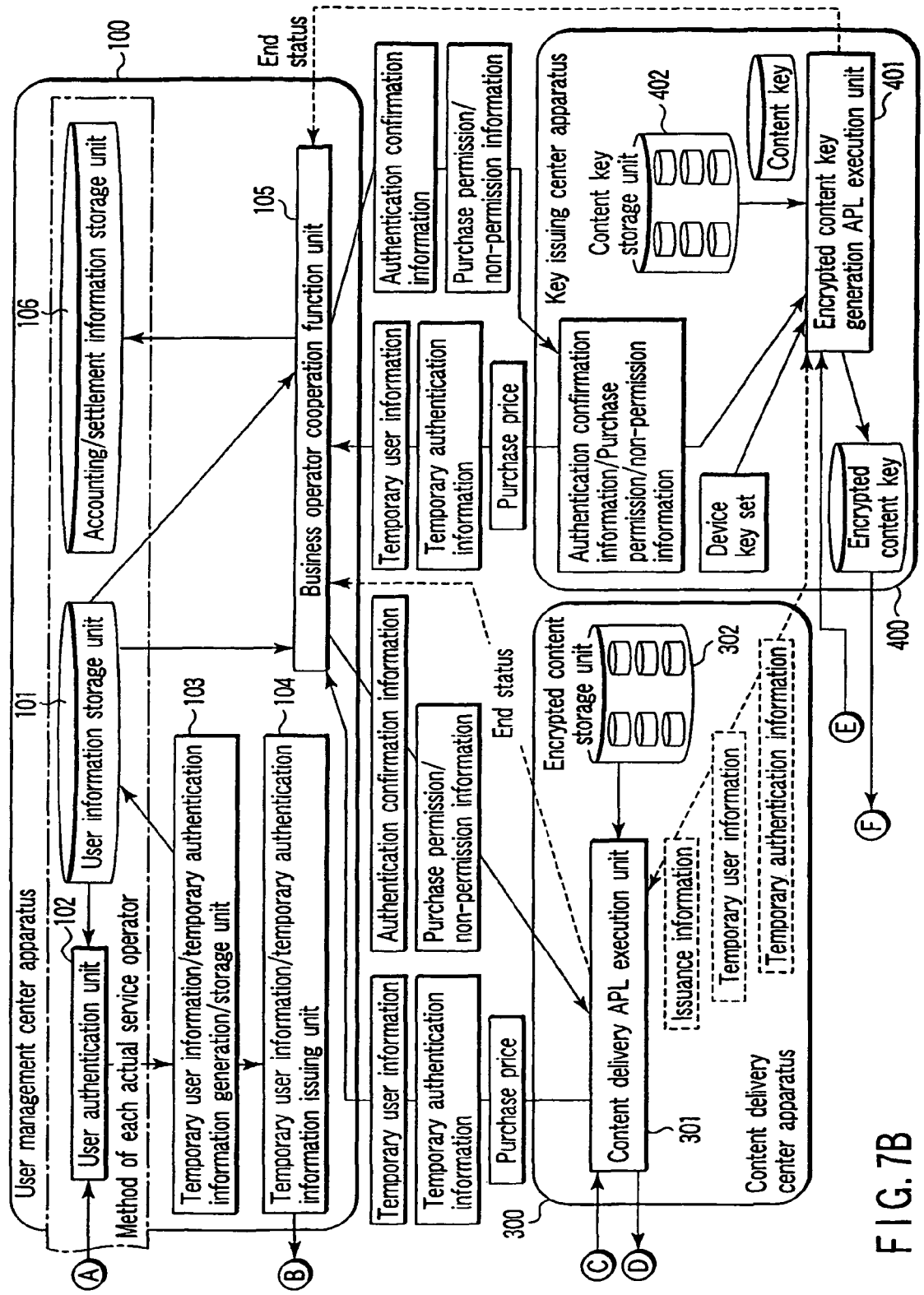

FIG. 7A and FIG. 7B show a schematic structure in the case where the system configuration that is described in connection with the first embodiment is applied to a content delivery service providing system. In this system, CPRM (Content Protection for Recordable Media) standard is applied to the network as an encryption technique for copyright protection. In the CPRM standard, a group of keys called MKB (Media Key Block) is recorded on the media side. Using the MKB and a device key, which is prepared on the device side, high-level copyright protection (copy control) is realized. The terms "media key information", "media unique identifier" and "apparatus unique key information", which are used in the description of the present system, correspond to "encryption key information", "identification number (ID)" and "device key", which are used in the CPRM standard.

The system shown in FIG. 7A and FIG. 7B is generally divided into a center side and a user side. The center side comprises a user management center apparatus 100, a content delivery center apparatus 300 and a key issuing center apparatus 400. The user management center apparatus 100 corresponds to the user management center apparatus TTP shown in FIG. 1, and the content delivery center apparatus 300 and key issuing center apparatus 400 correspond to the net-shop apparatus S. The user side comprises a user terminal apparatus 200 that includes a communication function-equipped personal computer (PC) or a similar communication terminal, and a hard disk or a DVD recorder that can store large-capacity content. The user terminal apparatus 200 corresponds to the user terminal apparatus U shown in FIG. 1.

In the present system, if the user management center apparatus 100 that executes user management authenticates that the user terminal apparatus is that of a valid user by an authentication process at the time of access, it is certified that the user terminal apparatus is that of the authenticated valid user. For this purpose, the user management center apparatus 100 generates temporary user information and temporary authentication information (hereinafter these information items are referred to as "TU information") and issues the generated information to the user terminal apparatus 200, content delivery center apparatus 300 and key issuing center apparatus 400.

This enables direct access between the user terminal apparatus 200 and content delivery center apparatus 300, or between the user terminal apparatus 200 and key issuing center apparatus 400, on the basis of the issued TU information. Thereby, even in a case where there are a plurality of centers that do not execute user management, direct data transactions with the user terminal apparatus 200 can be executed efficiently and securely, without their own information being recognized.

A description in greater detail will be given with reference to FIG. 7A and FIG. 7B.

The present system comprises a user management center apparatus 100, a user terminal apparatus 200, a content delivery center apparatus 300 and a key issuing center apparatus 400.

The user management center apparatus 100 generates TU information in the case where the user terminal apparatus 200 that has issued an access request is authenticated, and issues the TU information to the user terminal apparatus 200.

The user terminal apparatus 200 accesses (log-in) the user management center apparatus 100 via a communication line, thereby receiving the TU information for enjoying a content delivery service (data exchange service) from the apparatus 100. Using the TU information, the user terminal apparatus 100 issues access requests to the content delivery center apparatus 300 and key issuing center apparatus 400.

If the content delivery center apparatus 300 receives the access request, along with the TU information, from the user terminal apparatus 200, the content delivery center apparatus 300 sends the TU information to the user management center apparatus 100 and asks for authentication confirmation of the TU information. If the content delivery center apparatus 300 is informed by the user management center apparatus 100 of the confirmation of authentication, the content delivery center apparatus 300 issues content to the user terminal apparatus 200 and issues, where necessary, an end status to the user terminal apparatus 100, and also issues, where necessary, information to the key issuing center apparatus 400.

Similarly, if the key issuing center apparatus 400 receives the access request, along with the TU information, from the user terminal apparatus 200, the key issuing center apparatus 400 sends the TU information to the user management center apparatus 100 and asks for authentication confirmation of the TU information. If the key issuing center apparatus 400 is informed by the user management center apparatus 100 of the confirmation of authentication, the key issuing center apparatus 400 issues a content key to the user terminal apparatus 200 and issues, where necessary, an end status to the user terminal apparatus 100, and also issues, where necessary, information to the content delivery center apparatus 300.

Next, the details of each block are described.

In the user management center apparatus 100, a user information storage unit 101 stores user information including user personal information, a range of services and a method of payment, which are presented in advance by the user at the time of user registration. A user authentication unit 102 executes authentication on a user-by-user basis when services are to be provided to users. A temporary user information/ temporary authentication information generation/storage unit 103 temporarily generates and stores TU information when permission is given by the authentication at the user authentication unit 102, and registers the TU information in the user information storage unit 101 as part of the user information.

A temporary user information/temporary authentication information issuing unit 104 reads out the TU information, which corresponds to the user who has issued the access request, from the temporary user information/temporary authentication information generation/storage unit 103, and issues the TU information to the associated user terminal apparatus 200.

A business operator cooperation function unit 105 receives TU information from the content delivery center apparatus 300 and key issuing center apparatus 400, and executes, upon request for authentication confirmation, comparison/collation with TU information items of the user information that is registered in the user information storage unit 101. Thereby, the business operator cooperation function unit 105 confirms the validity of the TU information, and informs, if the validity is confirmed, the respective center apparatuses 300 and 400 of the successful authentication confirmation. If purchase price information is sent along with the TU information, the function unit 105 executes comparison/collation with purchase condition information of the user information that is registered in the user information storage unit 101. The function unit 105 sends purchase permission/non-permission information, which corresponds to the agreement/disagreement of the collation, to the respective center apparatuses 300 and 400. In addition, if the function unit 105 receives a content delivery end status from the content delivery center apparatus 300 and an encrypted content key generation end status from the key issuing center apparatus 400, the function unit 105 recognizes occurrence of accounting, acquires the associated user information from the user information storage unit 101, and stores or updates user accounting/settlement information in an accounting/settlement information storage unit 106.

In the user terminal apparatus 200, a log-in execution unit 201 issues, under the user's operation, an access request (log-in request) to the user management center apparatus 100. Upon permission by authentication, TU information is received from the user management center apparatus 100 and registered in a cooperation application (APL) execution unit 202.

The cooperation application execution unit 202 takes in the identifier of content, which is selected by the user, from a content list that is provided in advance. When accessing the content delivery center apparatus 300 to request desired content, the cooperation application execution unit 202 sends the content identifier of the desired content (where necessary, with media information and terminal unique information) along with the TU information. At this time, the content delivery center apparatus 300 requests the user management center apparatus 100 to confirm mutual authentication based on the TU information. Only when successful authentication confirmation is obtained, does the content delivery center apparatus 300 deliver encrypted content. Thereby, the user terminal apparatus 200 can acquire the encrypted content that is delivered from the content delivery center apparatus 300.

In addition, when accessing the key issuing center apparatus 400 to request an encrypted content key, the cooperation application execution unit 202 sends the content identifier of encrypted content, which is accompanied with media information (where necessary, also with terminal unique information), along with the TU information, to the key issuing center apparatus 400. At this time, the key issuing center apparatus 400 requests the user management center apparatus 100 to confirm mutual authentication based on the TU information. Only when successful authentication confirmation is obtained, does the key issuing center apparatus 400 deliver an encrypted content key. Thereby, the user terminal apparatus 200 can acquire the encrypted content key that is delivered from the key issuing center apparatus 400.

In the content delivery center apparatus 300, a content delivery application (APL) execution unit 301 receives an access request based on the TU information, content identifier, etc., from the user terminal apparatus 200, and requests the user management center apparatus 100 to confirm authentication of the TU information. If successful authentication confirmation is obtained, the content delivery application execution unit 301 reads out encrypted content from an encrypted content storage unit 302 on the basis of the content identifier, and delivers it to the user terminal apparatus 200 at the origin of the access request. In addition, when the delivery is completed, the content delivery application execution unit 301 generates an end status and sends it to the user management center apparatus 100. Moreover, where necessary, the content delivery application execution unit 301 sends encrypted content delivery information and TU information of the user at the destination of delivery to the key issuing center apparatus 400.

When requesting the user management center apparatus 100 to confirm authentication of the TU information, the content delivery APL execution unit 301 tells the purchase price of the content, the delivery of which is requested. The content delivery APL execution unit 301 receives purchase permission/non-permission information based on the purchase condition information of the pre-registered user information from the user management center apparatus 100. If the purchase is permissible, the content delivery APL execution unit 301 delivers the requested content to the user terminal apparatus 100. If the purchase is non-permissible, the content delivery APL execution unit 301 tells "NG" to the user terminal apparatus 100. When the content delivery is completed, the content delivery APL execution unit 301 sends a delivery end status to the user terminal apparatus 100 and requests a process for accounting/settlement.

In the key issuing center apparatus 400, an encrypted content key generation application (APL) execution unit 401 receives an access request based on the TU information, content identifier, media information, etc., from the user terminal apparatus 200, and requests the user management center apparatus 100 to confirm authentication of the TU information. If successful authentication confirmation is obtained, the encrypted content key generation APL execution unit 401 reads out a content key from a content key storage unit 402 on the basis of the content identifier, generates an individual encrypted content key from the media information (including a pre-registered device key set if terminal unique information is added), etc., and delivers it to the user terminal apparatus 200 at the origin of the request. In addition, when the delivery of the encrypted content key is completed, the encrypted content key generation APL execution unit 401 generates an end status and sends it to the user management center apparatus 100. Moreover, where necessary, the encrypted content key generation APL execution unit 401 sends content key delivery information to the content delivery center apparatus 300.

When requesting the user management center apparatus 100 to confirm authentication of the TU information, the encrypted content key generation APL execution unit 401 tells the purchase price of the encrypted content key, the delivery of which is requested. The encrypted content key generation APL execution unit 401 receives purchase permission/non-permission information based on the purchase condition information (e.g. upper-limit purchase price) of the pre-registered user information from the user management center apparatus 100. If the purchase is permissible, the encrypted content key generation APL execution unit 401 delivers the requested encrypted content key to the user terminal apparatus 100. If the purchase is non-permissible, the encrypted content key generation APL execution unit 401 tells "NG" to the user terminal apparatus 100. When the encrypted content key delivery is completed, the encrypted content key generation APL execution unit 401 sends a delivery end status to the user terminal apparatus 100 and requests a process for accounting/settlement.

The above-mentioned TU information is temporarily generated in the user management center apparatus 100 by a method such as random-number generation, and includes the content of authentication, etc. Preferably, the TU information should not be information that can be estimated according to a certain rule. In the present embodiment, the TU information is described as including temporary user information and temporary authentication information. The TU information, however, may include other temporary information.

This embodiment is similarly applicable to a case where a plurality of content delivery center apparatuses 300 and a plurality of key issuing center apparatuses 400 are present. The information that is transacted with the user terminal apparatus 200 is not limited to the encrypted content and content key, and may be other data.

Preferably, the user management center apparatus 100 should execute a process of accounting, etc. when the user management center apparatus 100 receives an end status from the content delivery center apparatus 300 and key issuing center apparatus 400, and should erase the TU information when all the authentication process is completed. It may be possible to determine the end of the authentication process by the reception of, e.g. the end status from the user terminal apparatus 200.

Second Embodiment

Figure 8:
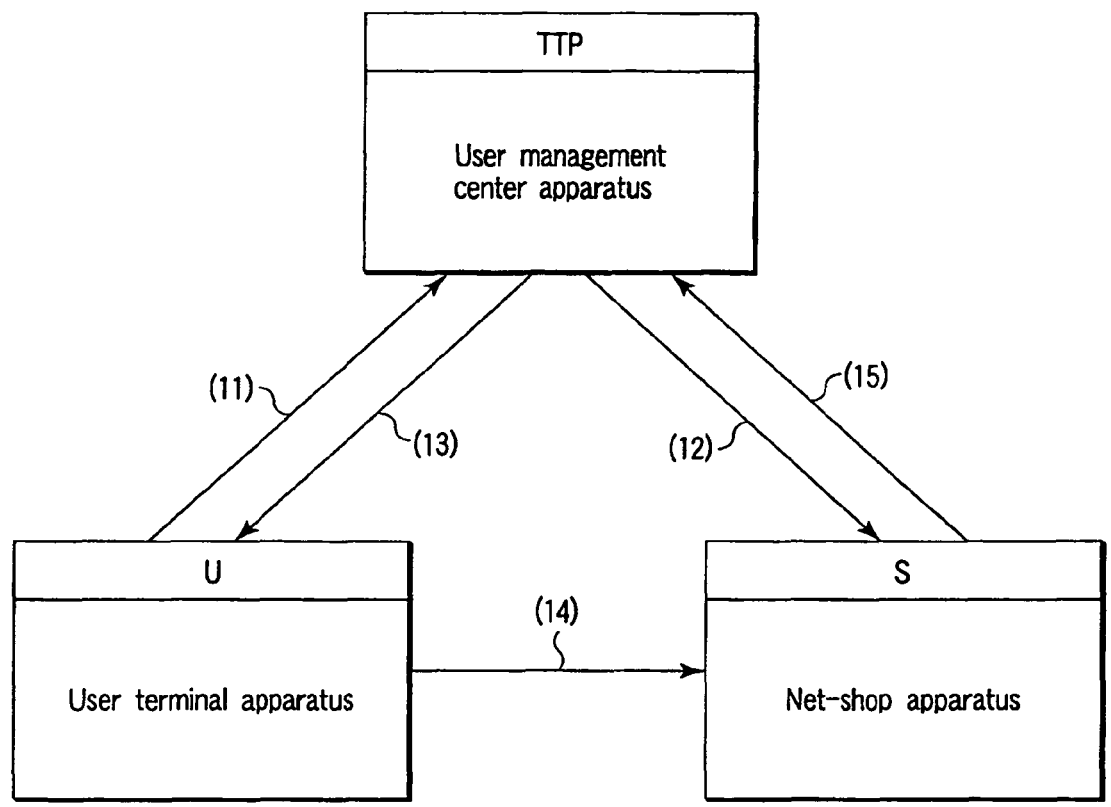
FIG. 8 is a conceptual view that illustrates the structure and the flow of information of a second embodiment of an information communication system according to the present invention.

FIG. 8 is a conceptual view that illustrates the schematic structure of an information communication system according to a second embodiment of the present invention. Like the first embodiment, this system is a system for a case in which a so-called net-shop is deployed. In this system for a net-shop, commodity information is provided to a user on the Internet, and the user designates a commodity to be purchased from among the commodities, the information on which has been provided. In FIG. 8, TTP designates an apparatus ("user management center apparatus") that is disposed in a user management center and functions to manage user personal information that is necessary for the user to enjoy online shopping services on the network. Symbol S denotes a net-shop apparatus for operating a net-shop on the network, and U designates a user terminal apparatus that enables the user to communicate with the user management center apparatus TTP and net-shop apparatus S over the network.

In this embodiment, the user terminal apparatus U designates the net-shop apparatus S and accesses the user management center apparatus TTP. The user management center apparatus TTP issues TU information to the user terminal apparatus U and net-shop apparatus S. The net-shop apparatus S stores the TU information from the user management center apparatus TTP. When the net-shop apparatus S receives a request from the user terminal apparatus U, authentication is executed based on the TU information. In this embodiment, it is presupposed that a reliable relationship between the user management center apparatus TTP and the net-shop apparatus S is established, and that the user management information (e.g. authentication information, user condition information, method of purchase) of the user, who participates in the online shopping, is registered in the user management center apparatus TTP.

The general flow is described below.

Figure 9:
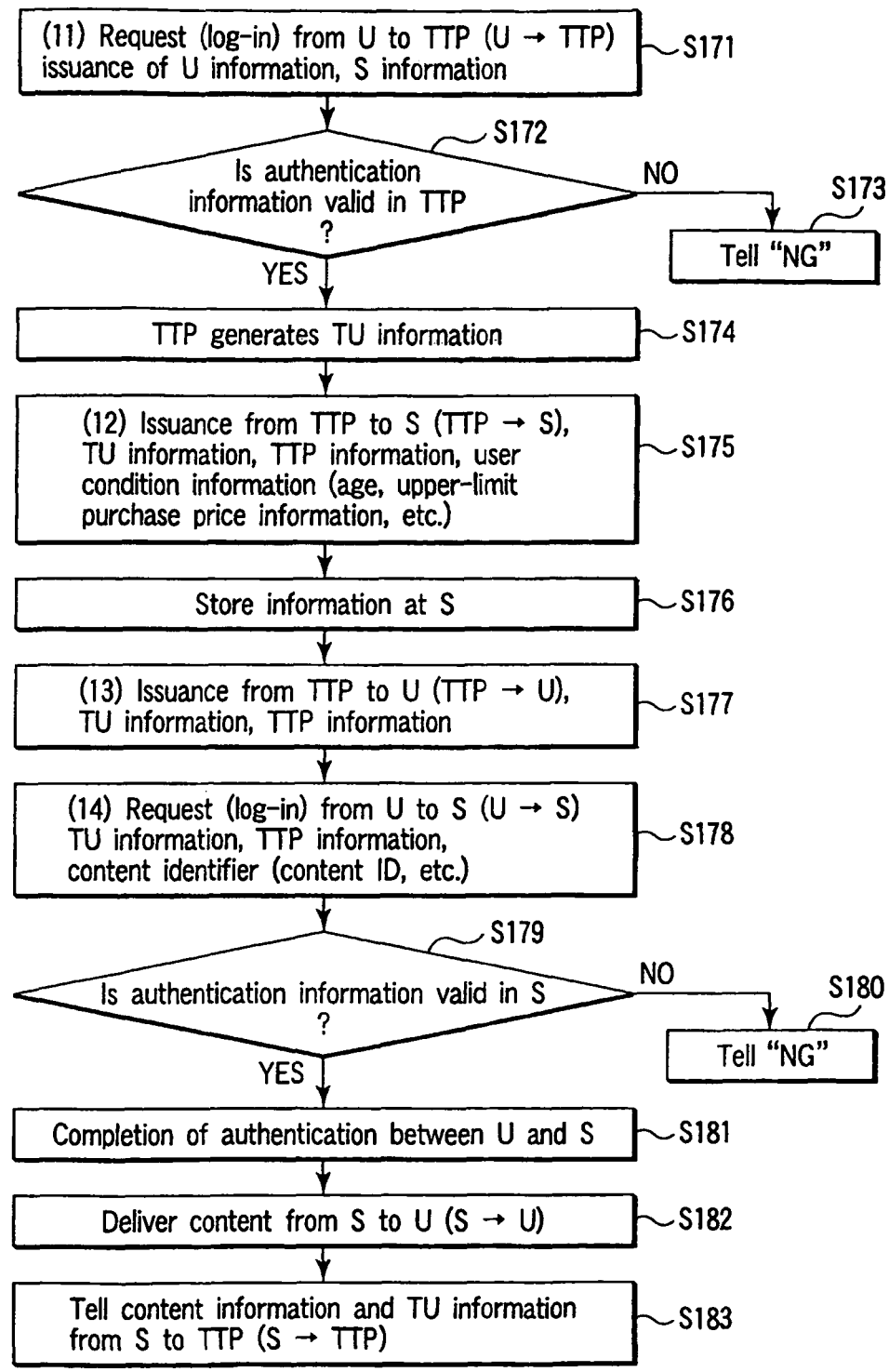
FIG. 9 is a flow chart that illustrates the flow of an overall process in the system shown in FIG. 8.

(11) A user who desires a content delivery service issues a log-in request to the user management center apparatus TTP via the user terminal apparatus U (FIG. 9: step S171). At this time, the user terminal apparatus U sends authentication information and net-shop designation information to the user management center apparatus TTP and undergoes authentication (FIG. 9: step S172). If the authentication fails, log-in is rejected and a notification of "NG" is issued (FIG. 9: step S173). If the authentication is successfully achieved, the user management center apparatus TTP generates TU information on the basis of the user management information (FIG. 9: step S174), and generates TTP information, where necessary (FIG. 9: step S175, S176).

(12) The user management center apparatus TTP issues TU information to the net-shop apparatus S that is designated on the basis of net-shop designation information (FIG. 9: step S175). In this case, where necessary, TTP information (in a case where there are a plurality of TTPs) and user condition information (e.g. age, and upper-limit purchase prices information) is added. The net-shop apparatus S temporarily stores the information from the user management center apparatus TTP (FIG. 9: step S176).

(13) At the time of the log-in request by the user terminal in the process (11), the user management center apparatus TTP executes authentication on the basis of the authentication information and determines the user is a valid user (FIG. 9: step S172). If the user is a valid user, the user management center apparatus TTP generates TU information (FIG. 9: step S174), and issues the TU information to the user terminal apparatus U (FIG. 9: step S177).

(14) Upon receiving the TU information from the user management center apparatus TTP, the user terminal apparatus U sends the TU information, TTP information and a content identifier (content ID, etc.) to the net-shop apparatus S, and issues a log-in/content delivery request (FIG. 9: step S178). The net-shop apparatus S compares and collates the TU information, which is sent at the time of the log-in/content delivery request, with the TU information from the user management center apparatus TTP (FIG. 9: step S179). If the TU information coincides, the net-shop apparatus S authenticates the valid user and permits log-in (FIG. 9: step S181). If the TU information does not agree, the net-shop apparatus S tells "NG" and rejects log-into the net-shop apparatus S as a matter of course (FIG. 9: step S180).

If the user log-in authentication is completed, the net-shop apparatus S delivers the content that is designated by the content identifier to the user terminal apparatus U at the origin of the request (FIG. 9: step S182). In addition, the net-shop apparatus S sends, as content information, purchase price information of the content that is designated by the content identifier, along with the TU information, to the user management center apparatus TTP (FIG. 9: step S183).

For example, in order to prevent tampering of a purchase price at the net-shop apparatus S, an optional process procedure, as indicated by a broken line in FIG. 10, is prepared in the process sequence. In this optional process procedure, when a log-in/content delivery request is issued from the user terminal apparatus U to the net-shop apparatus S in the process (14), the net-shop apparatus S sends, as confirmation information, the TU information, purchase price and content information to the user management center apparatus TTP (process (15)). Upon receiving the confirmation information, the user management center apparatus TTP sends destination-for-acquisition center (net-shop apparatus) information S, purchase price and content information to the user terminal apparatus U (process (16)), receives conformation information (OK, NG) that is generated as a response from the user terminal device U (process (17)), and forwards the confirmation information to the net-shop apparatus S (process (18)). In this way, the information relating to the purchase price is confirmed by the user, and then the content delivery is executed (process (19)). Therefore, the user can recognize the purchase price in advance, and it becomes possible to prevent tampering of the purchase price in the net-shop apparatus S.

Figure 11:
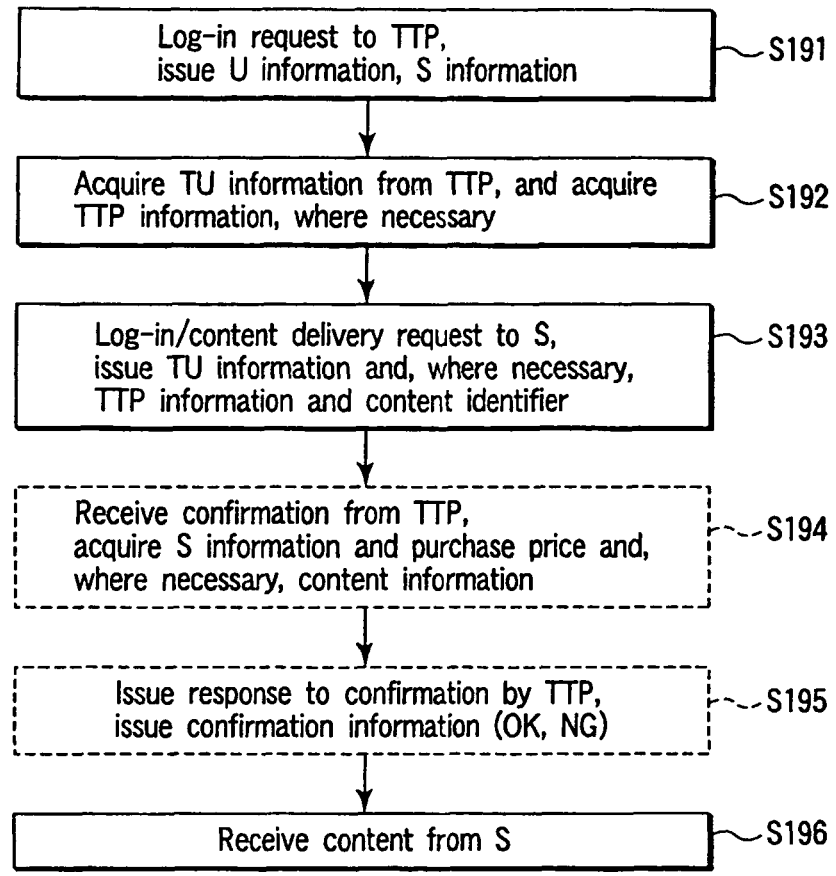
FIG. 11 is a flow chart that illustrates the flow of a process of a user terminal apparatus for realizing the second embodiment.
Figure 12:
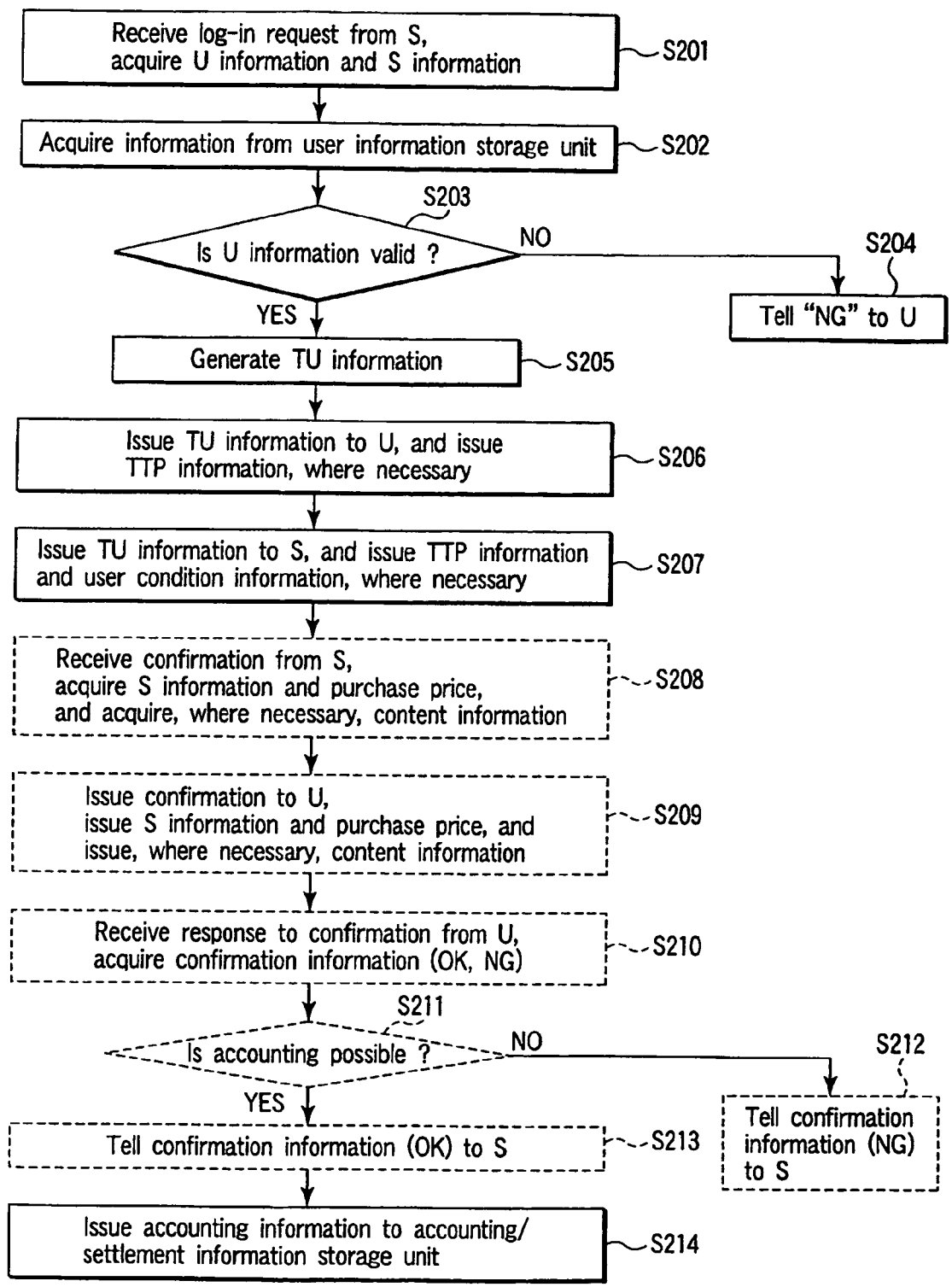
FIG. 12 is a flow chart that illustrates the flow of a process of a user management center apparatus for realizing the second embodiment.
Figure 13:
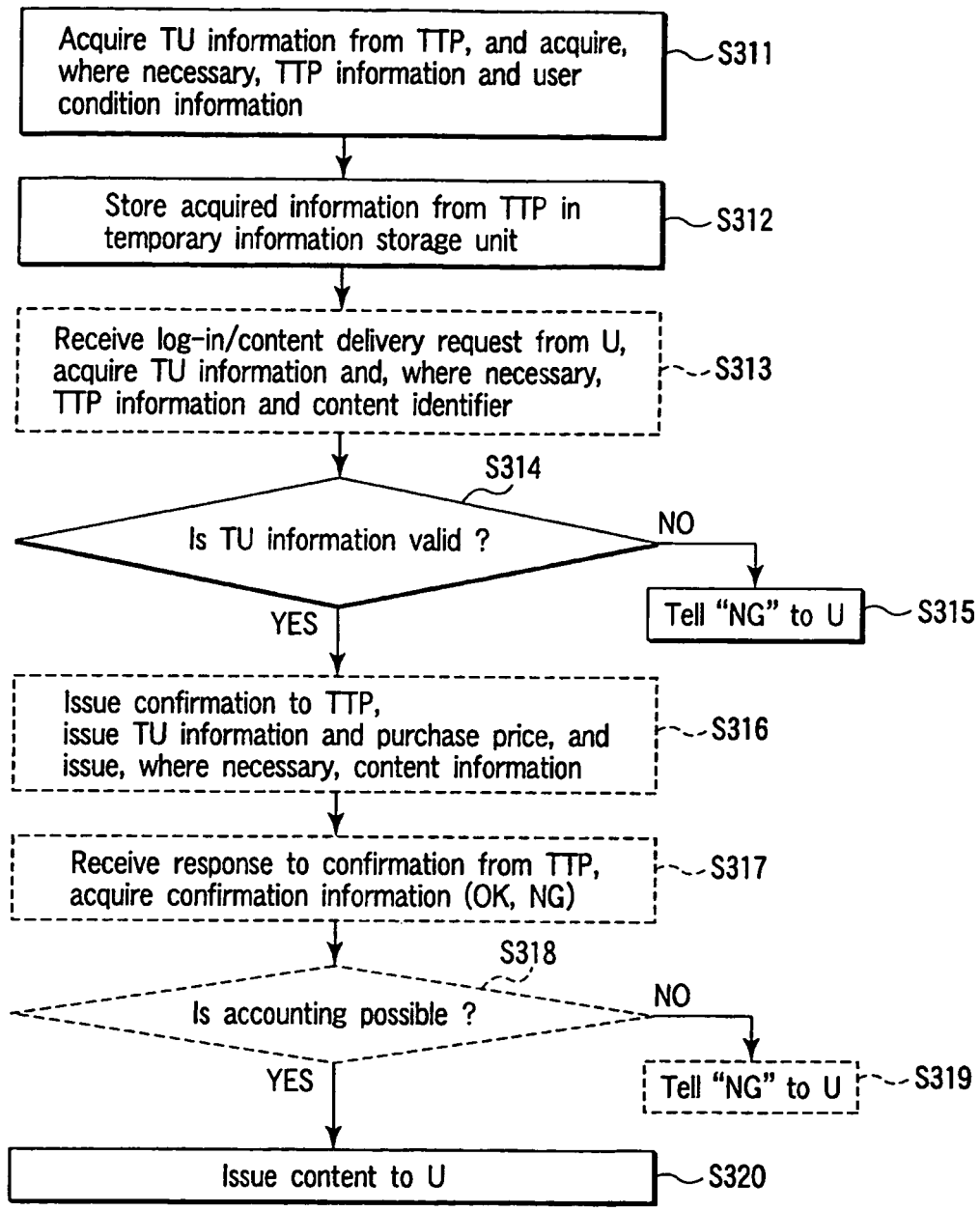
FIG. 13 is a flow chart that illustrates the flow of a process of a net-shop apparatus for realizing the second embodiment; and FIG. 14A

In order to realize the above process, the apparatuses U, TTP and S execute processes, as illustrated in flow charts of FIG. 11, FIG. 12 and FIG. 13. In FIGS. 11 to 13, process steps that are boxed in broken lines are optional ones, and may be omitted depending on cases.

As is shown in FIG. 11, the user terminal apparatus U sends a log-in request to the user management center apparatus TTP, and issues authentication information U for log-in and net-shop information S (step S191). In connection with this, the user terminal apparatus U acquires temporary information (TU) that is issued from the user management center apparatus TTP, and also acquires, where necessary, TTP information (step S192).

Subsequently, the user terminal apparatus U issues a log-in/content delivery request, along with the TU information, to the net-shop apparatus S, and also issues, where necessary, TTP information and a content identifier (content ID, etc.) (step S193).

In the case where the optional process for purchase price confirmation is set, the user terminal apparatus U receives a confirmation request from the user management center apparatus TTP, acquires net-shop information S and purchase price information, and acquires, where necessary, content information (step S194). Based on the received information, the user terminal apparatus U issues confirmation information (OK or NG) in response to the confirmation request from the TTP (step S195). After the process of step S193 or S195 is completed, the user terminal apparatus U receives the content that is delivered from the net-shop apparatus S (step S196).

As is shown in FIG. 12, the user management center apparatus TTP receives the log-in request from the user terminal apparatus U and acquires the authentication information U and net-shop information S (step S201). Then, the user management center apparatus TTP acquires personal information (authentication information) of the associated user from the user information storage unit (step S202) and determines whether the authentication information U is valid or not (step S203). If the authentication information U is not valid, the user management center apparatus TTP tells "NG" to the user terminal apparatus U and rejects the log-on (step S204).

If the authentication information U is valid, the user management center apparatus TTP generates TU information (step S205), issues the TU information to the user terminal apparatus U and issues, where necessary, TTP information (step S206). In addition, the user management center apparatus TTP issues the TU information to the net-shop apparatus S and issues, where necessary, TTP information and user condition information (age, upper-limit purchase price information, etc.) (step S207).

If the optional process for purchase price confirmation is set, the user management center apparatus TTP receives a confirmation request from the net-shop apparatus S, acquires purchase price information as well as net-shop information S, and acquires, where necessary, content information (step S208). Then, the user management center apparatus TTP issues a confirmation request to the user terminal apparatus U, and issues, where necessary, content information (step S209).

The user management center apparatus TTP receives a response to the confirmation request from the user terminal apparatus U, and receives confirmation information (OK, NG) (step S210). The user management center apparatus TTP determines whether accounting is executable or not (step S211). If the accounting is not executable, the user management center apparatus TTP tells "NG", as confirmation information, to the net-shop apparatus S (step S212). If the accounting is executable, the user management center apparatus TTP tells "OK", as confirmation information, to the net-shop apparatus S (step S213). After the process of step S207 or S213 is completed, the user management center apparatus TTP issues accounting information to the accounting/settlement information storage unit (step S214) and completes the series of process steps.

As is illustrated in FIG. 13, the net-shop apparatus S acquires TU information from the user management center apparatus TTP and acquires, where necessary, TTP information and user condition information (age, upper-limit purchase price, etc.) (step S311). The net-shop apparatus S stores the acquired information in the temporary information storage unit (step S312). In this state, the net-shop apparatus S receives a log-in/content delivery request from the user terminal apparatus U (step S313). At the time of reception, the net-shop apparatus S acquires TU information from the user terminal apparatus U, and acquires, where necessary, TTP information and a content identifier (content ID, etc.).

The net-shop apparatus S compares and collates the TU information from the user terminal apparatus U with the previously stored TU information from the user management center apparatus TTP, and determines whether the TU information is valid or not (step S314). If the TU information is not valid, the net-shop apparatus S tells "NG" to the user terminal apparatus U and rejects the log-in (step S315).

If the TU information is valid and the optional process for purchase price confirmation is set, the net-shop apparatus S issues a confirmation request to the user management center apparatus TTP, and sends the TU information along with purchase price information and, where necessary, content information (step S316). Then, the net-shop apparatus S receives a response to the confirmation request from the TTP, and acquires confirmation information (OK, NG) (step S317).

Subsequently, the net-shop apparatus S determines, on the basis of the confirmation information, whether accounting is executable or not (step S318). If the confirmation information is "NG", the net-shop apparatus S determines that accounting is not executable, and tells "NG" to the user terminal apparatus U (step S319). If the confirmation information is "OK", the net-shop apparatus S determines that accounting is executable, and delivers the content to the user terminal apparatus U (step S320).

According to the content delivery service providing system with the above-described structure, the user management center apparatus TTP batch-manages the user personal information, and issues the temporary information (temporary user information and temporary authentication information) TU to the user terminal apparatus U and net-shop apparatus S. Thus, based on the temporary information, mutual authentication can be executed between the user terminal apparatus U and net-shop apparatus S, and it is possible to securely and economically execute batch-management of the user, which becomes necessary when communication is performed between one or more net-shop apparatuses S and the user terminal apparatus U.

Example 2

Figure 14A:
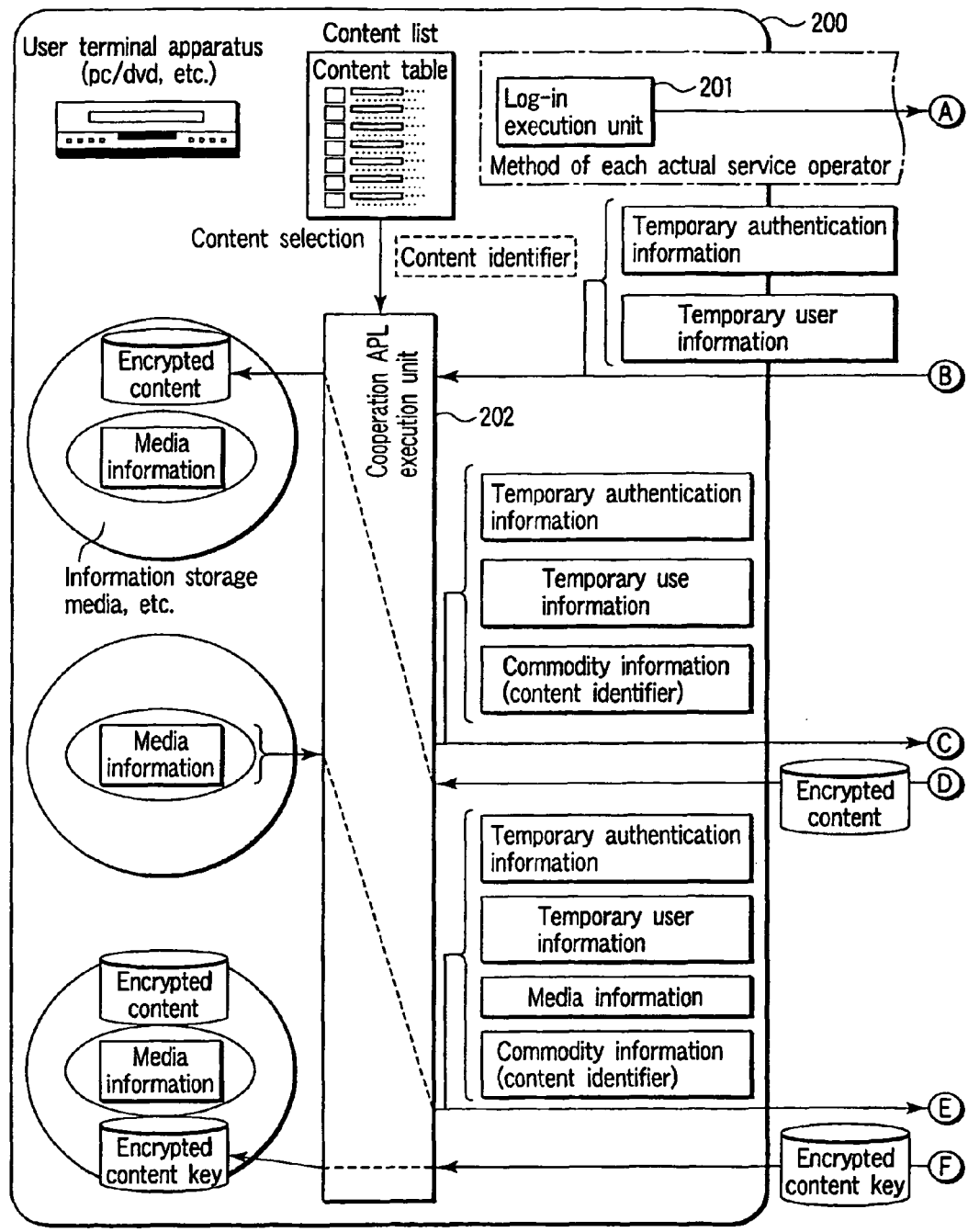
FIG. 14B is a conceptual view of Example 2, which schematically illustrates the structure and the flow of information in the case where the system configuration that is described in connection with the second embodiment is applied to a content delivery service providing system.
Figure 14B:
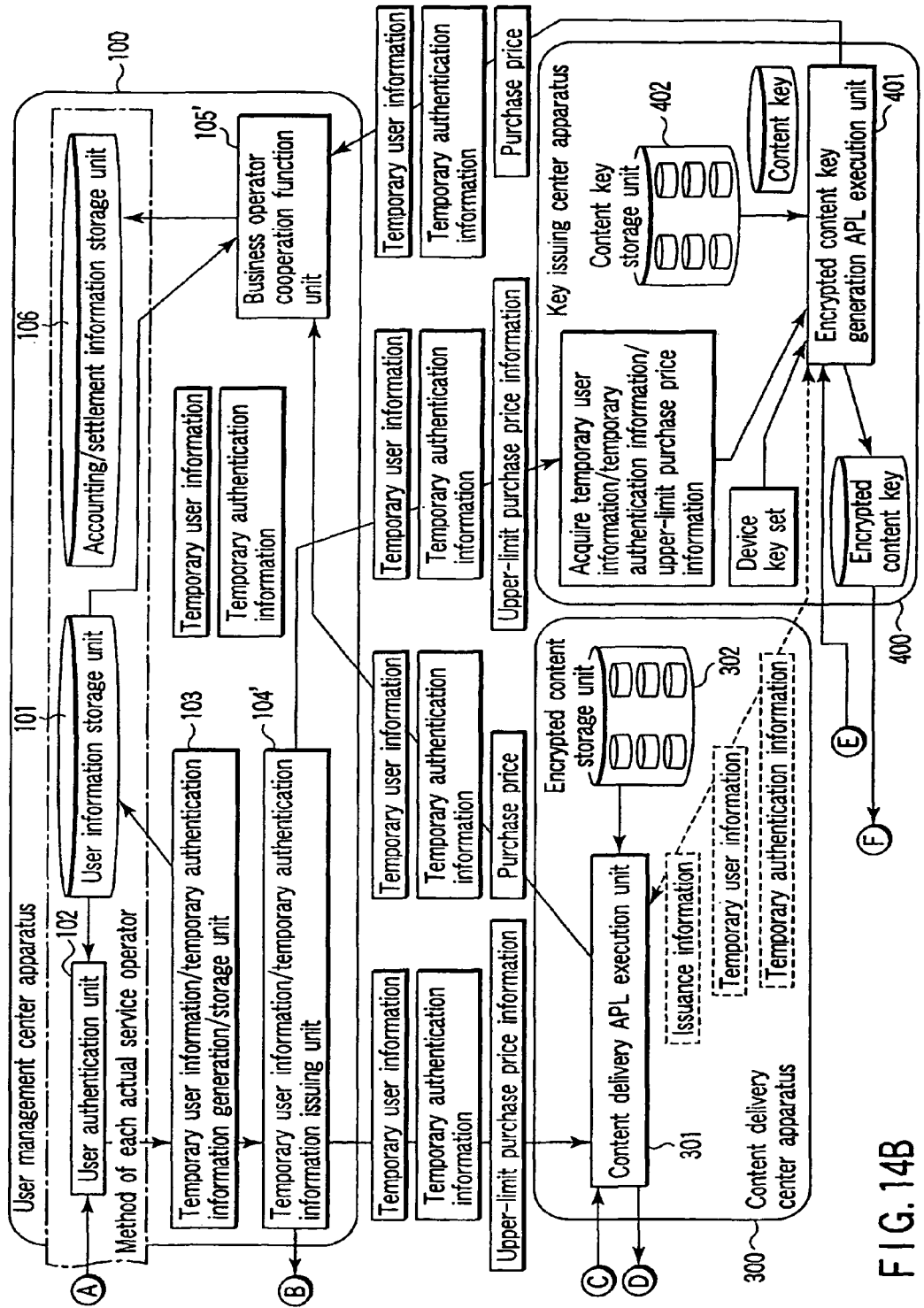

FIG. 14A and FIG. 14B show a schematic structure in the case where the system configuration that is described in connection with the second embodiment is applied to a content delivery service providing system. In this system, like Example 1, the CPRM standard is applied to the network as an encryption technique for copyright protection. The terms "media key information", "media unique identifier" and "apparatus unique key information", which are used in the description of the present system, correspond to "encryption key information", "identification number (ID)" and "device key", which are used in the CPRM standard. The present system has substantially the same structure as the system of Example 1. Thus, in FIG. 14A and FIG. 14B, the same parts as in FIG. 7A and FIG. 7B are denoted by like reference numerals.

The system shown in FIG. 14A and FIG. 14B is generally divided into a center side and a user side. The center side comprises a user management center apparatus 100, a content delivery center apparatus 300 and a key issuing center apparatus 400. The user management center apparatus 100 corresponds to the user management center apparatus TTP shown in FIG. 8, and the content delivery center apparatus 300 and key issuing center apparatus 400 correspond to the net-shop apparatus S. The user side comprises a user terminal apparatus 200 that includes a communication function-equipped personal computer (PC) or a similar communication terminal, and a hard disk or a DVD recorder that can store large-capacity content. The user terminal apparatus 200 corresponds to the user terminal apparatus U shown in FIG. 8.

In the present system, if the user management center apparatus 100 that executes user management authenticates that the user terminal apparatus is that of a valid user by an authentication process at the time of access, it is certified that the user terminal apparatus is that of the authenticated valid user. For this purpose, the user management center apparatus 100 generates TU information and issues the TU information to the user terminal apparatus 200, content delivery center apparatus 300 and key issuing center apparatus 400 that delivers a content key.

This enables direct access between the user terminal apparatus 200 and content delivery center apparatus 300, or between the user terminal apparatus 200 and key issuing center apparatus 400, on the basis of the issued TU information. Thereby, even in a case where there are a plurality of centers that do not execute user management, direct data transactions with the user terminal apparatus 200 can be executed efficiently and securely, without their own information being recognized.

A description in greater detail will be given with reference to FIG. 14A and FIG. 14B.

The present system comprises a user management center apparatus 100, a user terminal apparatus 200, a content delivery center apparatus 300 and a key issuing center apparatus 400.

The user management center apparatus 100 generates TU information in the case where the user terminal apparatus 200 that has issued an access request is authenticated, and issues the TU information to the user terminal apparatus 200, content delivery center apparatus 300 and key issuing center apparatus 400.

The user terminal apparatus 200 accesses (log-in) the user management center apparatus 100 via a communication line, thereby receiving the TU information for enjoying a content delivery service (data exchange service) from the apparatus 100.

The content delivery center apparatus 300 receives the TU information from the user management center apparatus 100, and executes authentication check for the access request from the user terminal apparatus 200. If the authentication is successfully achieved, the content delivery center apparatus 300 issues content to the user terminal apparatus 200, and issues, where necessary, information to the key issuing center apparatus 400.

The key issuing center apparatus 400 receives the TU information from the user management center apparatus 100, and executes authentication check for the access request from the user terminal apparatus 200. If the authentication is successfully achieved, the key issuing center apparatus 400 issues a content key to the user terminal apparatus 200, and issues, where necessary, information to the content delivery center apparatus 300.

Next, the details of each block are described.

In the user management center apparatus 100, a user information storage unit 101 stores user information including user personal information, a range of services and a method of payment, which are presented in advance by the user at the time of user registration. A user authentication unit 102 executes authentication on a user-by-user basis when services are to be provided to users. A temporary user information/temporary authentication information generation/storage unit 103 temporarily generates and stores TU information when permission is given by the authentication at the user authentication unit 102, and registers the TU information in the user information storage unit 101 as part of the user information.

A temporary user information/temporary authentication information issuing unit 104' reads out the TU information, which corresponds to the user who has issued an access request, from the generation/storage unit 103, and issues the TU information to the associated user terminal apparatus 200. At the same time or upon request, the temporary user information/temporary authentication information issuing unit 104' issues the TU information to the content delivery center apparatus 300 and key issuing center apparatus 400 as information that is necessary for authentication when direct data transactions are executed with the user terminal apparatus 200 via the communication line. In the temporary user information/temporary authentication information issuing unit 104' of this example, when the TU information is issued to the content delivery center apparatus 300 and key issuing center apparatus 400, purchase price condition information (e.g. upper-limit purchase price) for the associated user is added.

A business operator cooperation function unit 105' receives purchase price information from the content delivery center apparatus 300 along with the TU information, and also receives purchase price information from the key issuing center apparatus 400 along with the TU information. Thereby, the function unit 105' recognizes occurrence of accounting, acquires the associated user information from the user information storage unit 101 on the basis of the TU information, and stores or updates user accounting/settlement information in the accounting/settlement information storage unit 106.

In the user terminal apparatus 200, a log-in execution unit 201 issues, under the user's operation, an access request (log-in request) to the user management center apparatus 100. Upon permission by authentication, TU information is received from the user management center apparatus 100 and registered in a cooperation application (APL) execution unit 202.

The cooperation application execution unit 202 takes in the identifier of content, which is selected by the user, from a content list that is provided in advance. When accessing the content delivery center apparatus 300 to request desired content, the cooperation application execution unit 202 sends the content identifier of the desired content (where necessary, with media information and terminal unique information) along with the TU information. As a result, mutual authentication with the content delivery center apparatus 300 is executed on the basis of the TU information that is issued from the user management center apparatus 100. Only when permission by authentication obtained, is it possible to acquire encrypted content that is delivered from the content delivery center apparatus 300.

In addition, when accessing the key issuing center apparatus 400 to request an encrypted content key, the cooperation application execution unit 202 sends the content identifier of encrypted content, which is accompanied with media information, along with the TU information (where necessary, together with terminal unique information, etc.) to the key issuing center apparatus 400. As a result, mutual authentication based on the TU information is executed, and it becomes possible to acquire an encrypted content key that is delivered from the key issuing center apparatus 400.

In the content delivery center apparatus 300, a content delivery application (APL) execution unit 301 receives and registers the TU information from the user management center apparatus 100. In addition, the content delivery application (APL) execution unit 301 receives an access request based on the TU information, content identifier, etc., from the user terminal apparatus 200, and checks coincidence with the TU information from the user management center apparatus 100. If the TU information coincides, the content delivery application execution unit 301 reads out encrypted content from the encrypted content storage unit 302 on the basis of the content identifier, and delivers it to the user terminal apparatus 200 at the origin of the access request. In addition, when the delivery is completed, the content delivery application execution unit 301 generates an end status and sends it to the user management center apparatus 100. Moreover, where necessary, the content delivery application execution unit 301 sends encrypted content delivery information and TU information of the delivery-destination user to the key issuing center apparatus 400.

In the key issuing center apparatus 400, an encrypted content key generation application (APL) execution unit 401 receives and registers the TU information from the user management center apparatus 100. In addition, the encrypted content key generation application (APL) execution unit 401 receives an access request based on the TU information, content identifier, media information, etc., from the user terminal apparatus 200, and checks coincidence with the TU information from the user management center apparatus 100.

If the TU information coincides, the encrypted content key generation APL execution unit 401 reads out a content key from the content key storage unit 402 on the basis of the content identifier, generates an individual encrypted content key from the media information (including a pre-registered device key set if terminal unique information is added), etc., and delivers it to the user terminal apparatus 200 at the origin of the request. In addition, when the delivery of the encrypted content key is completed, the encrypted content key generation APL execution unit 401 generates an end status and sends it to the user management center apparatus 100. Moreover, where necessary, the encrypted content key generation APL execution unit 401 sends content key delivery information to the content delivery center apparatus 300.

The above-mentioned TU information is temporarily generated in the user management center apparatus 100 by a method such as random-number generation, and includes the content of authentication, etc. Preferably, the TU information should not be information that can be estimated according to a certain rule. In the present embodiment, the TU information is described as including temporary user information and temporary authentication information. The TU information, however, may include other temporary information.

This embodiment is similarly applicable to a case where a plurality of content delivery center apparatuses 300 and a plurality of key issuing center apparatuses 400 are present. The information that is transacted with the user terminal apparatus 200 is not limited to the encrypted content and content key, and may be other data.

Preferably, the user management center apparatus 100 should execute a process of accounting, etc. when the user management center apparatus 100 receives purchase price information from the content delivery center apparatus 300 and key issuing center apparatus 400, and should erase the TU information when all the authentication process is completed. It may be possible to determine the end of the authentication process by the reception of, e.g. the end status from the user terminal apparatus 200.

The present invention is not limited to the above-described embodiments. In practice, the structural elements can be modified without departing from the spirit of the invention. Various inventions can be made by properly combining the structural elements disclosed in the embodiments. For example, some structural elements may be omitted from all the structural elements disclosed in the embodiments. Furthermore, structural elements in different embodiments may properly be combined.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information communication system in which a user terminal apparatus accesses an information providing apparatus over a network and executes user authentication, thereby executing a communication service for purchasing a commodity, the system comprising:
   a user management apparatus that is disposed on the network, and which is configured to manage personal information of the user terminal apparatus, and to issue temporary information, which includes temporary user information and temporary authentication information, in accordance with a request from the user terminal apparatus,
   wherein the user management apparatus and the information providing apparatus are configured to execute user authentication between the user terminal apparatus and the information providing apparatus based on the temporary information that is issued by the user management apparatus, and
   wherein the user management apparatus is configured to send the temporary information to the user terminal apparatus that is an origin of the request, and also send the temporary information to the information providing apparatus that is designated by the user terminal apparatus,
   the user terminal apparatus is configured to present the temporary information to the information providing apparatus when the user terminal apparatus accesses the information providing apparatus from which the commodity is to be purchased, and
   the information providing apparatus is configured to execute the user authentication on the basis of the temporary information received from the user terminal apparatus and from the user management apparatus.

2. A user management apparatus of an information communication system in which a user terminal apparatus accesses an information providing apparatus over a network and executes user authentication, thereby executing a communication service for purchasing a commodity, the user management apparatus comprising:
   communication means for transmission/reception of information between the user terminal apparatus and the information providing apparatus on the network;
   personal information management means for managing personal information of the user terminal apparatus;
   temporary information issuing means for issuing, in accordance with a request from the user terminal apparatus, temporary information that includes temporary user information and temporary authentication information; and, wherein the temporary information issuing means further includes means for sending the temporary information to the information providing apparatus that is designated by the user terminal apparatus, and for sending the temporary information to the user terminal apparatus at an origin of the request; and
   authentication means for using the temporary information received from both the user terminal at an origin of the request and from the information providing apparatus to establish user authentication between the user terminal apparatus and the information providing apparatus.

3. The user management apparatus of the information communication system according to claim 2, further comprising condition information presenting means for presenting commodity purchase condition information of an associated user when the temporary information is sent to the information providing apparatus, causing the information providing apparatus to collate the commodity purchase condition information of the associated user with commodity designation information upon execution of the user authentication based on the temporary information, and causing the information providing apparatus to execute an accounting procedure and a commodity delivering process if the condition is satisfied.

4. The user management apparatus of the information communication system according to claim 2, further comprising:
   condition information presenting means for presenting commodity purchase condition information of an associated user when the temporary information is sent to the information providing apparatus, and causing the information providing apparatus to collate the commodity purchase condition information of the associated user with commodity designation information upon execution of the user authentication based on the temporary information; and
   purchase confirmation means for presenting price information of an associated commodity, which is told from the information providing apparatus when the collation shows that the condition is satisfied, to the user terminal apparatus, requesting commodity purchase confirmation, informing the information providing apparatus of a result of the commodity purchase confirmation, and causing the information providing apparatus to execute an accounting procedure and a commodity delivering process on the basis of the result of the commodity purchase confirmation.

5. An information providing apparatus of an information communication system that includes a user management apparatus, which is disposed on a network, in order to execute a communication service for purchasing a commodity by executing user authentication when accessed from a user terminal apparatus over the network, the user management apparatus managing personal information of the user terminal apparatus and issuing temporary information, which includes temporary user information and temporary authentication information, in accordance with a request from the user terminal apparatus, the information communication system executing the user authentication of the user terminal apparatus on the basis of the temporary information that is issued by the user management apparatus, the information providing apparatus comprising:
   temporary information acquisition means for acquiring the temporary information that is issued from the user management apparatus to the user terminal apparatus; and
   user authentication means for executing user authentication by collating the temporary information, which is presented at a time of access from the user terminal apparatus, with the temporary information that is acquired from the user management apparatus.

6. The information providing apparatus of the information communication system according to claim 5, further comprising commodity delivery process means for collating, when commodity purchase condition information of an associated user is presented from the user management apparatus along with the temporary information and commodity designation information is presented from the user terminal apparatus at a time of access based on the temporary information, the commodity purchase condition information of the associated user with the commodity designation information upon execution of the user authentication based on the temporary information, and executing an accounting procedure and a commodity delivering process if the condition is satisfied.

7. The information providing apparatus of the information communication system according to claim 5, further comprising price information telling means for collating, when commodity purchase condition information of an associated user is presented from the user management apparatus along with the temporary information and commodity designation information is presented from the user terminal apparatus at a time of access based on the temporary information, the commodity purchase condition information of the associated user with commodity information designated by the commodity designation information upon execution of the user authentication based on the temporary information, and telling the price information of the associated commodity to the user management apparatus if the condition is satisfied; and
   commodity delivery process means for executing an accounting procedure and a commodity delivering process upon receiving a confirmation result that is obtained when the user management apparatus tells the commodity price information to the user terminal apparatus and requests commodity purchase confirmation.

* * * * *